United States Patent
Edge et al.

(10) Patent No.: US 9,500,738 B2
(45) Date of Patent: Nov. 22, 2016

(54) UTILIZING A REFERENCE SIGNAL FOR INDOOR POSITIONING

(71) Applicant: QUALCOMM Incorporated, San Diego, CA (US)

(72) Inventors: Stephen William Edge, Escondido, CA (US); Chandrakant Mehta, Santa Clara, CA (US); Andreas Klaus Wachter, Menlo Park, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/167,049

(22) Filed: May 27, 2016

(65) Prior Publication Data

US 2016/0274215 A1 Sep. 22, 2016

Related U.S. Application Data

(63) Continuation of application No. 14/465,726, filed on Aug. 21, 2014, now Pat. No. 9,377,522.

(60) Provisional application No. 61/869,009, filed on Aug. 22, 2013.

(51) Int. Cl.
*G01S 1/08* (2006.01)
*G01S 5/08* (2006.01)
*H04W 64/00* (2009.01)
*H04W 4/02* (2009.01)

(52) U.S. Cl.
CPC ............... *G01S 5/08* (2013.01); *H04W 4/025* (2013.01); *H04W 64/006* (2013.01)

(58) Field of Classification Search
CPC ...... G01S 5/08; H04W 64/006; H04W 4/025
See application file for complete search history.

(56) References Cited

U.S. PATENT DOCUMENTS

| | | | |
|---|---|---|---|
| 5,859,612 A | 1/1999 | Gilhousen | |
| 2005/0035906 A1 | 2/2005 | Krause et al. | |
| 2005/0063343 A1* | 3/2005 | Hoffmann | H04B 7/0408 370/334 |
| 2007/0004363 A1 | 1/2007 | Kusaka et al. | |
| 2007/0077941 A1 | 4/2007 | Gonia et al. | |
| 2010/0302014 A1 | 12/2010 | Gloo et al. | |
| 2010/0323717 A1 | 12/2010 | Agashe et al. | |
| 2011/0199263 A1* | 8/2011 | Kang | G01S 3/48 342/442 |
| 2013/0029686 A1 | 1/2013 | Moshfeghi | |
| 2013/0084815 A1* | 4/2013 | Stirling-Gallacher | H04B 7/0617 455/101 |
| 2015/0133173 A1 | 5/2015 | Edge et al. | |

OTHER PUBLICATIONS

International Search Report and Written Opinion—PCT/US2014/052203—ISA/EPO—Jan. 21, 2015.

* cited by examiner

*Primary Examiner* — Erin File
(74) *Attorney, Agent, or Firm* — Berkeley Law & Technology Group, LLP

(57) ABSTRACT

Example methods, apparatuses, or articles of manufacture are disclosed herein that may be utilized, in whole or in part, to facilitate or support one or more operations or techniques for utilizing a reference signal for indoor positioning, such as for use in or with a mobile communication device, for example. In an implementation, a reference signal may be focused into a directed beam, for example using a phased antenna array, and rotated electronically through a sequence of directional angles in a horizontal plane. A mobile device may determine a most probable directional angle from one or more transmitters transmitting a directional beam, measure one or more parameters for each directional angle and determine a location estimate using, for example triangulation.

19 Claims, 9 Drawing Sheets

UTILIZING A REFERENCE SIGNAL FOR INDOOR POSITIONING

CROSS-REFERENCE TO RELATED APPLICATIONS

This application is a continuation of U.S. patent application Ser. No. 14/465,726, entitled "Utilizing a Reference Signal for Indoor Positioning", filed Aug. 21, 2014 which claims the benefit of and priority to U.S. Provisional Patent Application No. 61/869,009, entitled "Method and/or System for Indoor Positioning from a Reference Signal," filed on Aug. 22, 2013, which is assigned to the assignee hereof and which is expressly incorporated herein by reference.

BACKGROUND

1. Field

The present disclosure relates generally to indoor position or location estimations of mobile communication devices and, more particularly, to techniques for utilizing a reference signal to facilitate or support indoor positioning for use in or with mobile communication devices.

2. Information

Mobile communication devices, such as, for example, cellular telephones, portable navigation units, smartphones, tablets, laptop computers, personal digital assistants, or the like are becoming more common every day. Certain mobile communication devices, such as, for example, location-aware cellular telephones, smart telephones, or the like may assist users in estimating their geographic locations by making measurements of RF signals transmitted either from fixed beacons such as cellular base stations or WiFi or Bluetooth® Access Points or from orbiting positioning satellites whose orbital trajectories are accurately known. In an outdoor environment, mobile communication devices may obtain an estimate of their geographic location or so-called "position fix" by acquiring and measuring wireless signals from a satellite positioning system (SPS), such as the global positioning system (GPS) or other like Global Navigation Satellite Systems (GNSS) and from cellular base stations. Acquired and measured wireless signals may, for example, be processed by a mobile communication device or by a separate location server to determine a location estimate for the mobile device using one or more techniques such as trilateration and pattern matching.

In an indoor environment, certain mobile communication devices may be unable to reliably acquire or accurately measure wireless signals from a sufficient number of satellites and cellular base stations to enable determination of a location estimate or an accurate location estimate. Other techniques may instead be used to enable location or accurate location indoors. For example, a mobile communication device located indoors may obtain a position fix by acquiring and measuring wireless signals from three or more terrestrial wireless transmitters associated with a wireless local area network (WLAN), such as WiFi or Bluetooth access points. The measured access points may be identified in some cases by obtaining a Media Access Control identifier (MAC ID) address from wireless signals received from each access point and one or more characteristics of the received signals may be measured, such as a received signal strength indication (RSSI), round trip signal propagation time (RTT), signal to noise ratio (S/N), signal time of arrival (TOA), or the like. An indoor location for the mobile device may then be estimated using techniques such as trilateration or pattern matching, similar to or the same as techniques used to locate a mobile device outdoors, but applied to measurements of other types of signals. As an example, an indoor location of a mobile communication device may be estimated via radio heat map signature matching, for example, in which current characteristics of wireless signals received from access points at the device (e.g. RSSI, RTT) are compared with expected or previously measured signal characteristics for the access points stored as heat map values in a database.

In some instances, however, such as in larger indoor or like areas (e.g., shopping malls, airports, convention centers, office buildings, etc.), lack of sufficient WLAN transmitters and/or obstacles and impediments to WLAN signal propagation (e.g. imposed by walls in an office building or long distances in an airport or convention center) may reduce the number of WLAN transmitters from which a mobile device can acquire and accurately measure signals, resulting in no location estimate or a very inaccurate location estimate. Methods to improve indoor location in these and other environments may therefore be beneficial.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
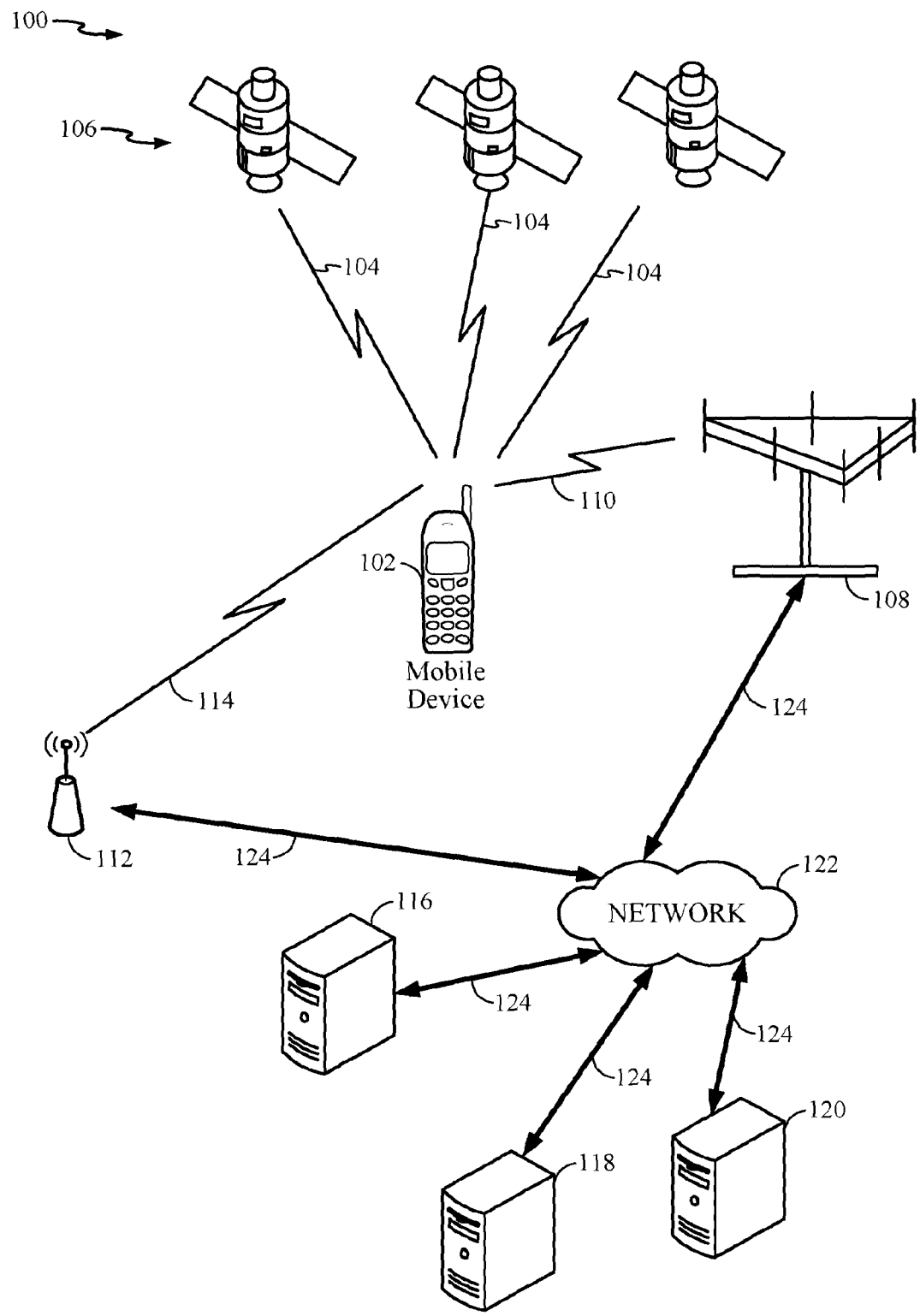
FIG. 1 is a schematic diagram illustrating features associated with an implementation of an example operating environment.

Example implementations relate to techniques for utilizing a reference signal for indoor positioning for use in or with a mobile communication device. In one implementation, a method for supporting positioning of a mobile communication device may comprise forming, at a first transmitter, a first directed beam via a transmission of a wireless signal at a sequence of directional angles in a horizontal plane; and encoding an indication of a directional angle of the sequence of directional angles of the first directed beam in the wireless signal.

In another implementation, method for locating a mobile communication device may comprise receiving, at the mobile communication device, a first directed beam transmitted by a first transmitter, wherein the first directed beam is transmitted in a first sequence of directional angles in a horizontal plane; determining a most probable directional angle for the first directed beam; measuring a first parameter related to the most probable directional angle for the first directed beam; and determining a location of the mobile device based, at least in part, on the measured first parameter.

In yet another implementation, an apparatus may comprise a mobile device comprising a wireless transceiver to communicate with an electronic communications network; and one or more processors to receive a first directed beam transmitted by a first transmitter, wherein the first directed beam is transmitted in a first sequence of directional angles in a horizontal plane; determine a most probable directional angle for the first directed beam; measure a first parameter related to a most probable directional angle for the first directed beam; and determine a location of the mobile device based, at least in part, on the measured first parameter.

In yet another implementation, an apparatus to support positioning of a mobile device may comprise a first transmitter to communicate with an electronic communications network; and one or more processors to communicate with the electronic communications network to form, at the first transmitter, a first directed beam via a transmission of a wireless signal at a sequence of directional angles in a horizontal plane; and encode an indication of a directional angle of the sequence of directional angles of the first directed beam in the wireless signal. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for utilizing a reference signal for indoor positioning for use in or with a mobile communication device. As used herein, "mobile device," "mobile communication device," "wireless device," "location-aware mobile device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, or the like. It should be appreciated, however, that these are merely examples of mobile devices that may be used, at least in part, to implement one or more operations or techniques for utilizing a reference signal for indoor positioning, and that claimed subject matter is not limited in this regard. It should also be noted that the terms "position", "position fix", "position estimate", "location", "location fix" and "location estimate" may be used interchangeably herein. Moreover, a "mobile device" may also be referred to herein or elsewhere as a "device", "wireless device", "mobile terminal", "terminal", "mobile station" (MS), "user equipment" (UE), "SUPL Enabled Terminal" (SET) or by some other name.

As alluded to previously, in an indoor environment or in certain partially enclosed or restricted outdoor areas (e.g., urban canyons, college campuses, railway stations, etc.), certain mobile devices may be unable to reliably receive or acquire sufficient satellite or cellular wireless signals to facilitate or support one or more position estimation techniques. Other techniques may then be employed to support location of a mobile device and related services such as indoor or outdoor navigation, direction finding, tracking, etc. For example, an indoor position fix of a mobile device, such as a cellular telephone, may be obtained based, at least in part, on information gathered from various systems. One such system may comprise, for example, a WLAN communication system having a number of WiFi access points (APs) supporting communications for a number of proximate mobile devices. To obtain a position fix, a mobile device may, for example, measure signals transmitted by one or more terrestrial wireless access points as was indicated earlier. Measurements may include measurements of RSSI, RTT, S/N and/or TOA and the transmitting APs may be identified from a MAC address, cell ID or some other identifier that are included in signals that are acquired and/or measured. Determination of a location estimate for a mobile device from the measurements may be performed at the mobile device or at a location server based on use of trilateration, multilateration, pattern matching and other similar techniques. The determination may make use of known locations for the transmitters whose signals are measured and/or may use RF heat maps that provide previously measured or predicted signal measurements at different known locations such as locations spaced at small intervals (e.g. 1 meter) in a rectangular or circular grid system. When the determination is performed at the mobile device, a location server may provide assistance data (e.g. containing the locations of transmitters and/or RF heat maps) to assist the determination. In some cases, assistance data (e.g. containing identities and transmission characteristics for transmitters), may also be provided to a mobile device by a location server to assist with the acquisition and measurement of the wireless signals from the transmitters When an RF heat map is used to determine an indoor (or outdoor) location of a mobile device via pattern matching, current or live characteristics or signatures of wireless signals received and measured at the mobile device may be compared with expected or previously measured signal characteristics at discrete locations stored as radio heat map values in a database. For example, during an off-line stage, a particular indoor area may be surveyed, and radio heat map values, such as in the form of RSSI or RTT measurements, or the like may be collected or compiled. During an on-line stage, a mobile device may, for example, communicate currently received or live signal signatures to a local server for matching with previously measured signal characteristics. By finding a signal signature in a database that more closely matches characteristics exhibited by signals currently received at a mobile device, a location associated with a matching signature may be used as an estimated location of the device.

As was indicated, in some instances, such as in larger indoor or like areas, measurement of signals from WiFi or Bluetooth access points or like wireless transmitters may be impaired or made impossible due to longer distances to APs, physical impediments to signal propagation (e.g. walls and floors) and/or physical geometry of an indoor propagation space (e.g. separate gate areas at an airport or separate wings in a hospital). As a consequence, signals from WiFi access points or like wireless transmitters may, for example, be attenuated, scattered, reflected or otherwise affected in some manner, which may at least partially preclude their use for reliable or suitable position estimations. For example, in some environments, a typical level of WiFi or like transmission power may, for example, be less than sufficient to measure or accurately measure an RSSI, RTT, S/N, TOA value etc. This may, for example, make indoor positioning and related location capabilities for certain mobile devices less reliable and less useful. Thus, at times, improving an ability to acquire and measure signals from one or more WiFi access points or like wireless transmitters may assist and improve positioning and related services for mobile devices.

As will be described in greater detail below, in an implementation, a suitable reference signal, such as a Highly Detectable Pilot (HDP) signal may be incorporated into one or more wireless signals transmitted by a WiFi access point or like wireless transmitter. It should be noted that while much of the description herein concerning the use of an HDP or like reference signal explicitly assumes transmission from a WiFi AP, conforming for example to one of the IEEE 802.11 family of standards, similar transmission of an HDP or like reference signal may be used by other wireless transmitters including but not limited to Bluetooth APs, Femtocells, home base stations, Home Evolved Node Bs and other transmitters in order to assist and improve positioning of a mobile device. In some instances, an HDP may comprise a reference signal that may be more detectable, such as at greater distances from a WiFi access point or like wireless transmitter than other wireless signals transmitted by such a transmitter. For example, at times, a transmitted positioning reference signal may contain a known sequence of symbols to facilitate or support measurements via signal integration over a period of time by a mobile device. The known sequence of symbols may be fixed and knowable by a mobile device or may be variable—e.g. may depend on (e.g. be a function of) an identifier for a WiFi AP or some other parameter for a WiFi AP. If the dependency (e.g. function) is standardized and thereby knowable by a mobile device, a mobile device may be able to predict the sequence of symbols either by detecting the identifier or other parameter in received transmission from the WiFi AP or by being provided (e.g. by a location server) with the identifier or other parameter. The mobile device may then attempt to acquire and measure the sequence of symbols via signal integration in which the received signal is correlated with the expected sequence of symbols. In some instances, a coherent signal integration over a period of time may be used, as may be the case for HDP defined for the High Rate Packet Data (HRPD) technology defined by the $3^{rd}$ Generation Partnership Project 2 (3GPP2), or for the Positioning Reference Signal (PRS) defined by the $3^{rd}$ Generation Partnership Project (3GPP) for positioning using Observed Time Difference of Arrival (OTDOA) for Long Term Evolution (LTE). In certain implementations, a reference signal may have one or more properties or physical level characteristics (e.g., power level, frequency band transmission, baseband modulation, etc.) of a PRS in LTE, for example, though claimed subject matter is not so limited. Higher detectability of an HDP or like reference signal may, for example, be due, at least in part, to the use of at least one of the following: a higher transmission power than that for other transmitted signals; use of a different RF channel or different RF frequency than that used for other transmitted signals by a transmitter (e.g. where signal propagation may be better and/or interference from other transmitters may be less); a signal modulation or encoding with better propagation characteristics (e.g., lesser attenuation, lower attenuation factor, etc.) than that for other transmitted signals; a known sequence of bits or symbols that may be received and coherently integrated over time by a mobile device; a muting by other transmitters during some or all time periods when an HDP or like reference signal is being transmitted by a particular transmitter; a sequence of bit or symbol encoding for an HDP or like reference signal that is orthogonal to the encoding used for other reference signals transmitted by the transmitter and/or reference signals transmitted by one or more other transmitters; or any combination thereof. Particular examples of a reference signal will be described in greater detail below with reference to FIGS. 2-3.

As was indicated, at times, an HDP or like reference signal may be used, at least in part, to facilitate or support positioning of a mobile device in an indoor area or other environment subject to signal attenuation, reflection and scattering etc. As discussed below, in an implementation, a reference signal may be transmitted at a suitable sequence of directional angles in a horizontal plane via a directed beam formed at a transmitter, such as a WiFi access point, as one possible example. In some instances, to allow a mobile device to measure a stronger signal, a sequence of directional angles may, for example, rotate a directed beam around a circle in a clockwise or counterclockwise direction. At times, a sequence of directional angles may, for example, target a most likely or estimated location of a mobile device. When transmission of an HDP or other reference signal from a WiFi AP (or other transmitter) is focused into a directed beam and rotated, the strength of the signal measured by a mobile device may vary. The signal strength may typically be strongest when the direction of the beam aligns with the direction of the mobile device as seen at the transmitting AP and may be weaker for other directions. For example, in the case of a perfectly focused beam where signal reflection and attenuation from impediments and obstacles are absent, the measured signal strength will be maximized when the beam direction and direction of the mobile device relative to the WiFi transmitter align and will be zero for other directions of the focused beam. In a more realistic case, where beam focusing is not perfect and where beam side lobes and a back lobe may occur, the measured signal strength may still be maximized when the beam direction (e.g. for the main lobe) and direction of the mobile device (relative to the WiFi transmitter) align, but may not be zero for other beam directions. However, by determining properties of the acquired signal associated with measurement of maximum signal strength for the acquired signal, a mobile device or a location server may be able to determine the location or information concerning the location for the mobile device. For example, if the transmitted beam contains information that encodes the direction of the beam that can be decoded by a mobile device, the mobile device may determine the direction of the beam corresponding to maximum signal strength and thereby determine the direction of the mobile device relative to the WiFi transmitter.

In at least one implementation, as mentioned above, an indication of a directional angle of a directed beam may be encoded in a transmitted wireless signal, such as a reference signal, for example. An indication of a directional angle may comprise a parameter indicative of a starting time of a sequence of directional angles or a current directional angle relative to a suitable frame of reference. When a current directional angle is included, a mobile device or a location server can directly determine the direction of the mobile device relative to the transmitter by determining when the signal strength of the directional beam is maximized as described earlier. When a starting time of a sequence of directional angles is included, a mobile device or a location server may determine the time of any directional angle in the sequence if the sequence follows known or other predefined rules. For example, if the directional angle rotates in a circle in a horizontal plane clockwise at a constant angular speed starting at an angle of 0 degrees (as defined in some suitable frame of reference) and ending at an angle of 360 degrees and taking 60 seconds to complete a full rotation and the start time is known to be T in units of seconds, then the time for any subsequent clockwise angle $\alpha$ ($0 \leq \alpha \leq 360$) would be $(T+(\alpha/6))$ seconds. A mobile device may then determine the time t when the measured signal strength (e.g. RSSI) or signal quality (e.g. S/N) from the directional beam is at a maximum. The time t may be used by the mobile device or a location server to determine the direction of the beam at that time (assuming that time measurement at the mobile device is the same as or can be related to time at the transmitter) which will then give the direction of the mobile device from the transmitter. In the previous example, the direction $\alpha$ of the focused beam and the mobile device would be given by 6 (t−T), for example. The suitable frame of reference for defining the angle $\alpha$ may be an absolute geographic frame (e.g. aligned with true North), a frame aligned with a magnetic direction such as magnetic North, or a frame relative to a current orientation of the transmitting device which may have to be determined separately as described further on herein. More details of this method are provided further on taking into account such factors as time synchronization between the mobile device and a transmitter and determining orientation and direction from a transmitter.

FIG. 1 is a schematic diagram illustrating features associated with an implementation of an example operating environment 100 capable of facilitating or supporting one or more processes or operations for utilizing a reference signal for indoor positioning for use in or with a mobile device, such as a location-aware mobile device 102, for example. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an outdoor environment, which may include partially enclosed areas, such as urban canyons, town squares, amphitheaters, parking garages, rooftop gardens, patios, or the like, as well as completely open areas.

As illustrated, in an implementation, mobile device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS') such as, for example, WAAS, EGNOS, QZSS, just to name a few examples.

At times, mobile device 102 may, for example, transmit wireless signals to, or receive wireless signals from, a suitable wireless communication network. In one example, mobile device 102 may communicate with a cellular communication network by transmitting wireless signals to, or receiving wireless signals from, a base station transceiver 108 over a wireless communication link 110. Similarly, mobile device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, or the like, depending on an implementation. In some instances local transceiver 112 may comprise, for example, a wireless transmitter or receiver capable of transmitting or receiving wireless signals.

In a particular implementation, local transceiver 112 may be capable of communicating with mobile device 102 at a shorter range over wireless communication link 114 than at a range established via base station transceiver 108 over wireless communication link 110. For example, local transceiver 112 may be positioned in an indoor environment and may provide access to a wireless local area network (WLAN, e.g., IEEE Std. 802.11 network, etc.) or wireless personal area network (WPAN, e.g., Bluetooth network, etc.). In another example implementation, local transceiver 112 may comprise a femtocell transceiver capable of facilitating communication via link 114 according to a suitable cellular communication protocol. Of course, it should be understood that these are merely examples of networks that may communicate with mobile device 102 over a wireless link, and claimed subject matter is not limited in this respect. For example, in some instances, operating environment 100 may include a larger number of base station transceivers 108, local transceivers 112, etc.

In an implementation, base station transceiver 108, local transceiver 112, etc. may communicate with servers 116, 118, or 120 over a network 122 via one or more links 124. Network 122 may comprise, for example, any combination of wired or wireless communication links. In a particular implementation, network 122 may comprise, for example, a cellular wireless network such as a GSM network, W-CDMA network, LTE network or CDMA2000 network. In another implementation, network 122 may comprise a wireless local area network (WLAN) supporting, for example, wireless access using IEEE 802.11 standards or Bluetooth. In an implementation, one or both of local transceiver 112 and base station transceiver 108 and/or one or more of servers 116, 118 and 120 may be part of network 130. In some implementations network 122 may have access to (e.g. may be connected to) other networks (not shown in FIG. 1) such as the Internet. Network 122 may further be capable of facilitating or supporting communication between mobile device 102 and one or more of servers 116, 118, 120, etc. via local transceiver 112, base station transceiver 108, etc.

In particular implementations, and as discussed below, mobile device 102 may have circuitry or processing resources capable of computing a position fix or estimated location of mobile device 102. For example, mobile device 102 may compute a position fix based, at least in part, on pseudorange measurements to four or more SPS satellites 106 using position methods such as Assisted GPS (A-GPS) and Assisted GNSS (A-GNSS). Here, mobile device 102 may compute such pseudorange measurements based, at least in part, on code phase detections in signals 104 acquired from four or more SPS satellites 106. In particular implementations, mobile device 102 may receive from one or more servers 116, 118, or 120 positioning assistance data to aid in the acquisition and measurement of signals 104 transmitted by SPS satellites 106 and/or to assist mobile device 102 to compute a location from these measurements. The assistance data may include, for example, almanac, ephemeris data, Doppler search windows, data on ionospheric and tropospheric signal propagation delay, timing information just to name a few examples. In other implementations, mobile device 102 may perform pseudorange measurements of SPS satellites and transfer the measurements to one of servers 116, 118 and 120 to compute a location of mobile device 102.

In some implementations, mobile device 102 may obtain a position fix by acquiring and measuring wireless signals received from one or more terrestrial transmitters (e.g., base station transceiver 108, local transceiver 112, etc.) using any one of several position methods, such as, for example, Advanced Forward Link Trilateration (AFLT), Observed Time Difference of Arrival (OTDOA), or the like. In these techniques, mobile device 102 may, for example, measure phase differences or timing differences between reference signals received from two or more pairs of base stations (e.g. including base station transceiver 108). The phase or timing differences may be transferred to a server such as server 116, 118 or 120 for computation of a location estimate for mobile device 102 based on known locations and known transmission timing for the measured base stations. Alternatively, the location computation may be performed by mobile device 102 if a server (e.g. server 116, 118 or 120) sends the base station locations and any transmission timing as assistance data to mobile device 102. Here, servers 116, 118, or 120 may be capable of providing positioning assistance data to mobile device 102 including, for example, locations, identities, orientations, etc. of terrestrial transmitters to facilitate one or more suitable positioning techniques (e.g., AFLT, OTDOA, etc.). At times, servers 116, 118, or 120 may include, for example, a base station almanac (BSA) indicating locations, identities, orientations, etc. of cellular base stations in one or more particular areas or regions associated with operating environment 100.

As alluded to previously, in particular environments, such as indoor environments or urban canyons, mobile device 102 may not be capable of acquiring and measuring signals 104 from a sufficient number of SPS satellites 106 and/or base stations (such as base station transceiver 108) to enable mobile device 102 or one of servers 116, 118, 120 to obtain a location estimate for mobile device 102 (e.g., using A-GPS, A-GNSS, AFLT and/or OTDOA, etc.). Thus, optionally or alternatively, mobile device 102 may be capable of computing a position fix based, at least in part, on signals acquired and measured from one or more local transmitters, such as femtocells, WiFi access points, Bluetooth access points or the like that may include local transceiver 112. For example, mobile device 102 may measure an RSSI, an RTT and/or an S/N value based on reference signals and other signals received from one or more access points. The measurements may be transferred to a server (e.g. server 116, 118 or 120) for computation of a location for mobile device 102 or mobile device may compute the location itself if a server (e.g. server 116, 118 or 120) provides suitable assistance data such as providing the locations and transmission characteristics (e.g. transmission power, transmission timing, antenna gain) for the measured APs. In some implementations, mobile device 102 or a server (e.g. server 116, 118 or 120) may, for example, obtain an indoor position fix by comparing signal measurements (e.g. RSSI or RTT) obtained by mobile device 102 for one or more APs to a radio context parameter map indicating expected signal measurements (e.g. for RSSI or RTT) at different locations. The server or mobile device 102 may perform pattern matching to find a location for which the expected signal measurements most closely match the measurements obtained by mobile device 102. The radio context parameter map be obtained (e.g. by a server such as server 116, 118 or 120) based on building plans or street maps that allow signal propagation from APs at known locations to be predicted or based on measurements collected by site surveying or measurements crowd sourced from mobile devices at known locations.

In an implementation, mobile device 102 may, for example, receive positioning assistance data for one or more indoor positioning operations from one or more of servers 116, 118, or 120. At times, positioning assistance data may include, for example, locations, identities, orientations, transmission characteristics etc. of one or more local transceivers 112, base station transceivers 108, etc. positioned at known locations. In some instances, positioning assistance data to aid indoor positioning operations may include, for example, radio context parameter maps, routeability graphs, etc., just to name a few examples. Other assistance data received by mobile device 102 may include, for example, electronic digital maps of indoor or like areas for display or to aid in navigation. A map may be provided to mobile device 102 as it enters a particular area, for example, and may show applicable features such as doors, hallways, entry ways, walls, etc., points of interest, such as bathrooms, pay phones, room names, stores, or the like. By obtaining a digital map of an indoor or like area of interest, mobile device 102 may, for example, be capable of overlaying its current location over the displayed map of the area so as to provide an associated user with additional context, frame of reference, or the like. The terms "positioning assistance data" and "navigation assistance data" may be used interchangeably herein.

According to an implementation, mobile device 102 may access indoor navigation assistance data via one or more of servers 116, 118, or 120 by, for example, requesting such data using the Secure User Plane Location (SUPL) location solution defined by the Open Mobile Alliance (OMA). In such an implementation, the server providing the assistance data may be or function as a SUPL Location Platform (SLP) and may further function as a Home SLP (H-SLP) or a Discovered SLP (D-SLP). In some implementations, mobile device 102 may request and obtain assistance data from one or more of servers 116, 118 or 120 using the LTE Positioning Protocol (LPP) defined by 3GPP and/or the LPP Extensions (LPPe) protocol defined by OMA. In some implementations, LPP and/or LPPe may be used in combination with SUPL. For example, mobile device 102 may establish a SUPL session with a D-SLP or H-SLP, which may be one of servers 116, 118 or 120, may exchange LPP or LPP/LPPe positioning messages embedded within SUPL messages with the D-SLP or H-SLP, with the SUPL messages transferred as part of the SUPL session. In some implementations, a server (e.g. server 116, 118 or 120) may use SUPL and/or LPP or LPP/LPPe to send assistance data to mobile device 102 without an initial request from, mobile device 102. In some implementations, a server may request location related measurements or a location estimate from a mobile device 102 (e.g. using positioning methods such as A-GPS, A-GNSS, OTDOA, AFLT or methods related to measurement of WiFi or Bluetooth APs) using SUPL and/or LPP or LPP/LPPe and mobile device 102 may return the requested measurements or requested location estimate using SUPL and/or LPP or LPP/LPPe. In particular implementations, servers 116, 118, or 120 may be capable of providing indoor navigation assistance data to cover many different indoor areas including, for example, floors of buildings, wings of hospitals, terminals at an airport, portions of a university campus, areas of a large shopping mall, just to name a few examples. Also, if memory or data transmission resources at mobile device 102 make receipt of indoor positioning assistance data for all areas served by servers 116, 118, or 120 impractical or infeasible, a request for such data from mobile device 102 may, for example, indicate a rough or course estimate of a location of mobile device 102. Mobile device 102 may then be provided with indoor navigation assistance data covering, for example, one or more areas including or proximate to a roughly estimated location of mobile device 102.

In some embodiments, one or more positioning techniques, such as, for example, probabilistic positioning or other techniques may be used, in whole or in part, in association with one or more context maps to obtain a position fix of mobile device 102. For example, one or more methods that may be used, at least in part, with signal signatures of a wireless environment may be applied to one or more sensor measurements, sensor signatures, sensor signals, context or social data, etc. as represented by one or more context maps. For example, in an implementation, a radio heat map may associate identities of one or more base station transceivers 108, local transceivers 112, etc. (e.g., a MAC address, etc.) with expected signal signatures, mean values or standard deviations from these expected signal signatures, etc. It should be understood, however, that these are merely examples of a context or radio heat map, and that claimed subject matter is not limited in this respect. In some embodiments, one or more filters, such as a particle filter, for example, may be used, at least in part, to perform one or more applicable positioning operations or techniques.

According to an implementation, in operative use, local transceiver 112 may, for example, transmit a reference signal (e.g., an HDP, PRS, etc.) at a sequence of directional angles in a horizontal plane, as was indicated. A transmitted signal may, for example, be broadcast on a suitable WiFi frequency channel and may contain a sequence of known symbols or bits to facilitate or support one or more signal measurements, as will be seen. At times, a reference signal transmitted by local transceiver 112 may, for example, be encoded with information detectable and/or decodable by mobile device 102 in conditions under which a normal or typical transmission power level from local transceiver 112 is insufficient to transmit information using other signals. In some instances, as was indicated, a coherent signal integration over a period of time, as may be the case for HDP for HRPD, or PRS for positioning using OTDOA for LTE, for example, may be used, at least in part, or otherwise considered. In at least one implementation, by acquiring these one or more transmitted reference signals, mobile device 102 may, for example, compute or obtain a position fix via one or more appropriate techniques.

Even though a certain number of computing platforms or devices are illustrated herein, any number of suitable computing platforms or devices may be implemented to facilitate or support one or more techniques or processes associated with operating environment 100. For example, at times, network 122 may be coupled to one or more other wired or wireless communications networks (e.g., WLAN, etc.) so as to enhance a coverage area for communications with mobile device 102. In some instances, network 122 may facilitate or support femtocell-based operative regions of coverage, for example. Again, these are merely example implementations, and claimed subject matter is not limited in this regard.

Figure 2:
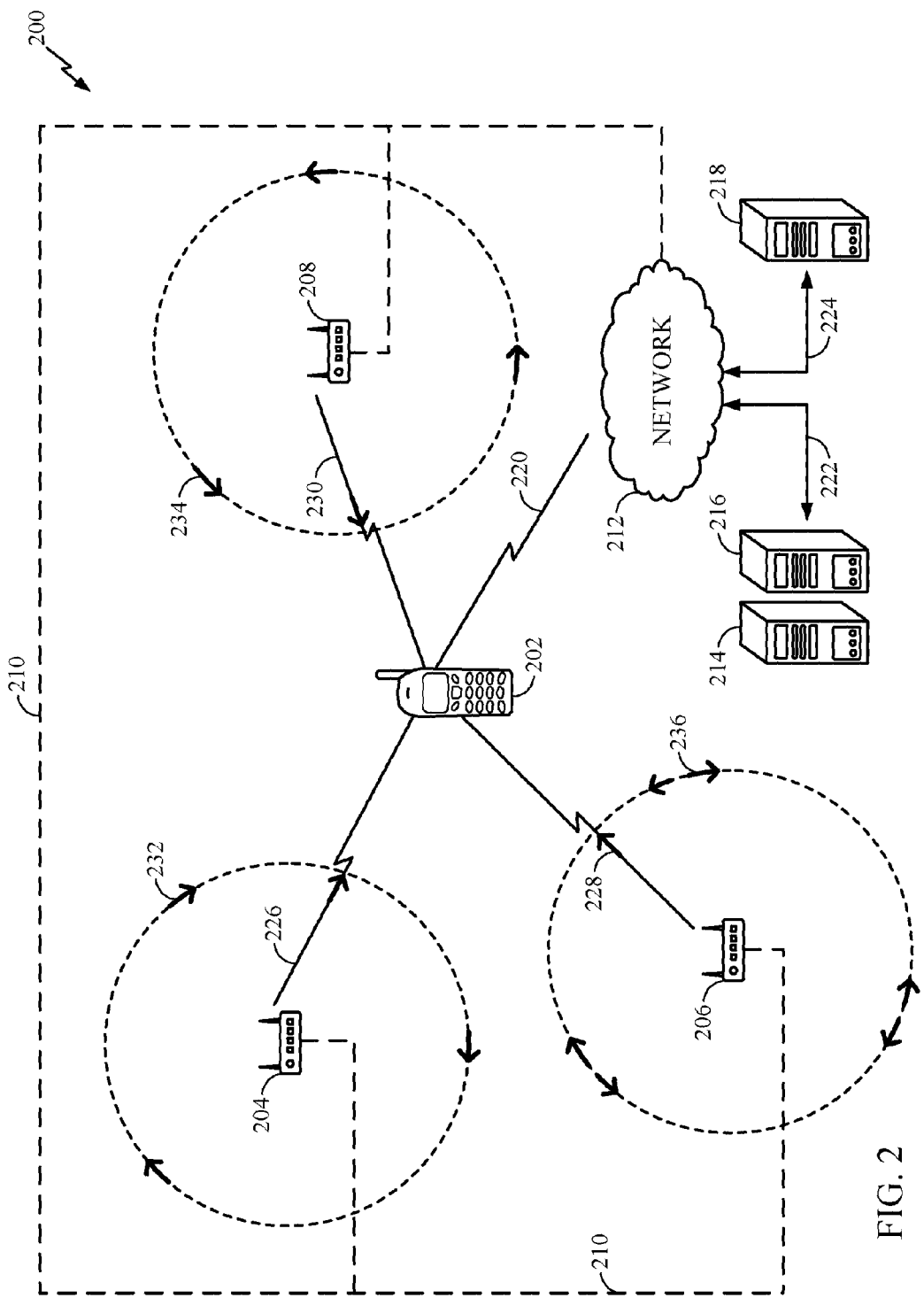
FIG. 2 is a schematic diagram illustrating features associated with an implementation of an example indoor operating environment.

FIG. 2 is a schematic diagram illustrating features associated with an implementation of an example indoor or like operating environment 200 that may be capable of facilitating or supporting one or more processes or operations for utilizing a reference signal for indoor positioning for use in or with a mobile device, such as a location-aware mobile device 202, for example. As was indicated, operating environment 200 may comprise, for example, an indoor or like area in which satellite signals (e.g., signals 104 of FIG. 1) or signals from base stations and/or access points (e.g. signals 110 and 114 of FIG. 1) may not be reliably received, acquired or measured, such as by mobile device 202 located therein. In addition, in some instances, operating environment 200 may comprise, for example, a large, complex, cluttered, etc. indoor or like area in which cellular, WiFi, Bluetooth or similar signal distribution or coverage from wireless transmitters such as transmitters 204, 206, and 208 may be less than sufficient or adequate to enable a mobile device such as mobile device 202 to perform a sufficient number of location related measurements (such as of RSSI, RTT, S/N) to enable a location estimate or an accurate location estimate to be determined. At times, operating environment 200 may, for example, be associated with or include one or more features or aspects of operating environment 100 of FIG. 1. For example, mobile device 202 may correspond to or share common properties with mobile device 102 of FIG. 1; each of servers 214, 216 and 218 may correspond to or share common properties with one of servers 116, 118 and 120 in FIG. 1; network 212 may correspond to or share common properties with network 122 in FIG. 1; and each of wireless transmitters 204, 206, and 208 may correspond to or share common properties with one of base station transceiver 108 and local transceiver 112 in FIG. 1.

Likewise, it should be appreciated that operating environment 200 is described herein as a non-limiting example that may be implemented, in whole or in part, in the context of various communications networks or combination of networks, such as discussed above with reference to FIG. 1. Similarly, operating environment 200 may, for example, be communicatively enabled using one or more special purpose computing platforms, communication devices, information storage devices, or the like. It should also be noted that one or more operations or techniques described herein may be utilized, at least in part, in an indoor-like environment (e.g., urban canyons, etc.), outdoor environment, or any combination thereof.

As illustrated, wireless transmitters 204, 206, and 208 may be operatively arranged within operating environment 200 and may each a comprise (i) an IEEE 802.11 standard WiFi access point, (ii) a Bluetooth access point, or (iii) a femtocell, home base station or small cell supporting wireless transmission according to the LTE family of specifications produced by 3GPP—e.g. including LTE, LTE Advanced (LTE-A) and LTE unlicensed (LTE-U). Each of wireless transmitters 204, 206 and 208 may transmit as well as receive wireless signals, or may in some implementations act only as beacons and transmit signals but not, or not typically, receive wireless signals. Wireless transmitters 204, 206, and 208 may all be the same type of device or represent different types of devices, such as WiFi access points, Bluetooth access points, radio beacons, base stations, femtocells, GNSS pseudolites, etc. Although not shown, operating environment 200 may be defined, for example, by a particular indoor or like area (e.g., a shopping mall, office space, etc.) comprising a number of entryways, hallways, cubicles, walls, dividers, staircases, doors, rooms, elevators, or the like.

As indicated generally by a dashed line at 210, wireless transmitters 204, 206, and 208 may be operatively coupled to a network 212 that may comprise, for example, one or more wired or wireless communication links capable of making available or providing positioning assistance data related to operating environment 200. Positioning assistance data may, for example, be accessed by or provided to mobile device 202 by one or more of servers 214, 216, and 218 via links 222 or 224. In some instances, positioning assistance data may comprise, for example: (i) identities, locations, orientations, wireless type (e.g. whether WiFi, Bluetooth or LTE), transmission characteristics (e.g. transmission power, transmission timing, antenna gain) etc. of wireless transmitters 204, 206, or 208; and/or (ii) radio context parameter maps, signal signatures, routeability graphs, electronic digital maps, or the like. Although not shown, operating environment 200 may include a grid of points at discrete locations, such as associated with locations on a radio heat map constructed for all or part of operating environment 200, for example. Thus, for one or more of wireless transmitters 204, 206, and 208, a radio heat map may, for example, associate a particular grid point with an expected signal measurement or "signature" (e.g. for RSSI or RTT) from one or more wireless transmitters, as discussed above. Based, at least in part, on a reference signal transmitted by one or more of wireless transmitters 204, 206, and 208, the expected signal measurements or "signal signatures" may, for example, enable mobile device 202 to correlate observed signal measurements (e.g., RSSI, RTT, etc.) with particular locations within operating environment 200, as will be seen.

In an implementation, wireless transmitters 204, 206, or 208 may transmit a wireless signal, such as a reference signal, for example, that may be received or acquired by mobile device 202. At times, wireless transmitters 204, 206, or 208 may, for example, employ a beam forming technique so as to focus a respective transmitted wireless signal over a relatively narrow directional angle. Thus, as illustrated via arrows at 226, 228, and 230, at times, a wireless signal transmitted via wireless transmitters 204, 206, or 208 may respectively comprise, for example, a directed beam. In addition, each reference signal may comprise an HDP or PRS or similar signal with improved detectability as described earlier that enables improved signal acquisition and measurement by a mobile device, such as mobile device 202. The use of either a focused beam or a PRS or HDP reference signal may enable location related measurements by a mobile device such as mobile device 202 in any environment where signals from the same transmitter that are not focused or do not comprise an HDP or PRS do not enable location related measurements or accurate location related measurements by the mobile device. In addition, by using a focused beam that comprises an HDP or PRS reference signal, even better location related measurements may be enabled compared to measurements of signals from the same transmitter that use neither or at most one of beam focusing or an HDP or PRS signal. In some instances, and as illustrated in FIG. 2, directed beam 226, 228, or 230 may be rotated by respective wireless transmitters 204, 206, or 208 in a circle in a horizontal plane, such as in a clockwise direction 232, counterclockwise direction 234, or any combination thereof, indicated generally at 236. Thus, a sequence of directional angles may, for example, be represented via positive values or by positive changes (e.g. corresponding to clockwise rotation), negative values or negative changes (e.g. corresponding to counterclockwise rotation), or any combination thereof. Rotation of directed beam 226, 228, or 230 may, for example, allow mobile device 202 to measure a stronger signal and, thereby, obtain or determine a direction to or from corresponding wireless transmitter 204, 206, or 208.

The rotation of the wireless reference signal transmitted from each of transmitters 204, 206 and 208 may be achieved mechanically—e.g. by physically rotating an antenna or antenna array for each transmitter. However, instead of or in addition to a mechanical rotation, directed beams 226, 228, or 230 may, for example, be "virtually" or electronically rotated by wireless transmitters 204, 206, or 208 via a transmission of a corresponding wireless signal at a suitable sequence of directional angles. In some instances, directed beam 226, 228, or 230 may, for example, be implemented via a radiation pattern of constructive and destructive signal interferences characterized by a main lobe (e.g., a point of a highest gain, maximum transmission power, etc.) defining a direction of beam 226, 228, or 230. At times, a main lobe may, for example, be produced together with a back lobe (e.g., a signal with a smaller field strength opposite a main lobe, etc.), nulls (e.g., signal cancellations, etc.), as well as side lobes (e.g., a signal with a smaller field strength, etc.). For example, in at least one implementation, a phased array antenna may be utilized, in whole or in part, to rotate directed beams 226, 228, or 230. In some other implementations, a transmitter may use a pair of antennas, a set of four antennas or a more complex array (such as a phased array) and may transmit a common signal from each of the antennas with differences in signal phase and/or amplitude that enable signal reinforcement in some directions and signal cancellation in other directions. The phase and/or amplitude differences may be pre-calculated to produce a signal predominantly in one direction (e.g. the main lobe) or in some cases in two or more directions. Claimed subject matter is not limited in respect of methods to achieve a directional beam. Parameter settings to rotate directed beams 226, 228, or 230 (e.g., parameters defining signal phase differences and/or signal amplitude differences to different antennas) may be determined in advance experimentally and/or via calculation and may be pre-defined or configured in each transmitter in advance. The transmitter may vary the parameter settings in order to rotate the transmitted beam or otherwise direct the beam through a sequence of directional angles. At times, the angular width of a directed beam that is not tightly focused such as via a typical WiFi access point or like wireless transmitter (e.g. possessing only 2 or 4 antennas) may not be small (e.g. may be 10 degrees, etc.), implying that a mobile device would measure a high signal strength over a range of directional angles (e.g. 10 degrees) which would limit the accuracy of determining a directional angle to or from a transmitter, but it may nevertheless improve location accuracy of mobile device 202, for example, as will be seen.

In FIG. 2, mobile device 202 may be informed by a server (e.g. server 214) that one or more of transmitters 204, 206 and 208 are transmitting a rotating reference signal beam. This information may be provided as part of assistance data requested by mobile device 202 from the server or sent without any request by the mobile device 202. In some implementations, the information may include characteristics of the rotation such as a sequence of directional angles for each rotation, a constant angular speed of rotation, a direction of rotation (e.g. clockwise or counterclockwise), an expected time or times for each directional angle, a starting directional angle, a starting time or sequence of starting times for each rotation, etc. The information may further include an identification of the frequency or frequencies used by each directional beam, the times when each beam will be or will not be transmitted and a code value for the HDP or PRS reference signal used for the beam that can be used to determine the sequence of symbols (e.g. OFDM symbols), bits, chips (e.g. CDMA chips) or other constituents of the signal that may be used by a mobile device 202 to acquire the signal through integration over time. Different transmitters may transmit HDP or PRS reference signals using different frequencies and/or at different times and/or using different code sequences to avoid or reduce interference between the beams of different transmitters and enable a mobile device 202 to acquire and measure each reference signal with little or no interference from other reference signals. Mobile device 202 may determine when a particular reference signal is strongest (e.g. RSSI or S/N is maximized). If a reference signal is not tightly focused and has an angular width of say 10 degrees or more but is being rotated at a constant angular speed, a mobile device 202 may assume the strongest measurement to occur in the middle of the time period of strongest signal reception. A mobile device 202 may then determine a most probable angular direction for the beam in one of several ways. If the reference signal encodes the current directional angle from the transmitter and the mobile device is able to decode this, the mobile device can obtain the directional angle by decoding the signal when reception is strongest. If the reference signal does not encode a directional angle but is rotated according to some known time sequence, a mobile device may determine a time of strongest reception and then determine a corresponding directional angle if provided with the known time sequence. This may require use of a common time at both the transmitter and the mobile device—e.g. GPS or GNSS time that is available to both the mobile device 202 and a transmitter such as transmitter 204, 206 or 208.

A most probable directional angle that can be determined by a mobile device 202 may provide the angle of the beam relative to some fixed direction such as an absolute geographic direction (e.g. true North) or a magnetic direction (e.g. magnetic North) and may coincide with a beam direction at a transmitter (e.g. transmitter 204, 206 or 208) that is directed exactly or approximately towards the mobile device from the transmitter. The location of the mobile device 202 would then lie somewhere along the beam. FIG. 2 illustrates three directional beams, 226 from transmitter 204, 228 from transmitter 206 and 230 from transmitter 208, that are transmitted in the general direction of mobile device 202 from each transmitter. Knowing the location of each of the transmitters, the mobile device 202 or a server such as 214, 216 or 218 can obtain the location of mobile device 202 using triangulation. For example, in FIG. 2, the three directional beams 226, 228 and 230 will all intersect at or near to the location of mobile device 202 in this illustration. Due to errors in measuring signal strength (or signal quality) and imprecision in signal beam rotation, it is possible that the measured directional angles will not lead to exact triangulation of the location of mobile device 202 but instead would lead to the associated directional beams intersecting at different locations nearby to the true location of mobile device 202. In that case, mobile device 202 or a server may average the locations at which different pairs of the directional beams (e.g. 226, 228 and 230 in FIG. 2) intersect. Alternatively, a location maybe found whose mean perpendicular distance to each directional beam (e.g. inversely weighted by the expected accuracy of each directional beam) is minimal. Averaging, weighting and/or minimizing in other ways may also be used—e.g. minimizing the sum of the squares of the perpendicular distances referred to above.

Figure 3:
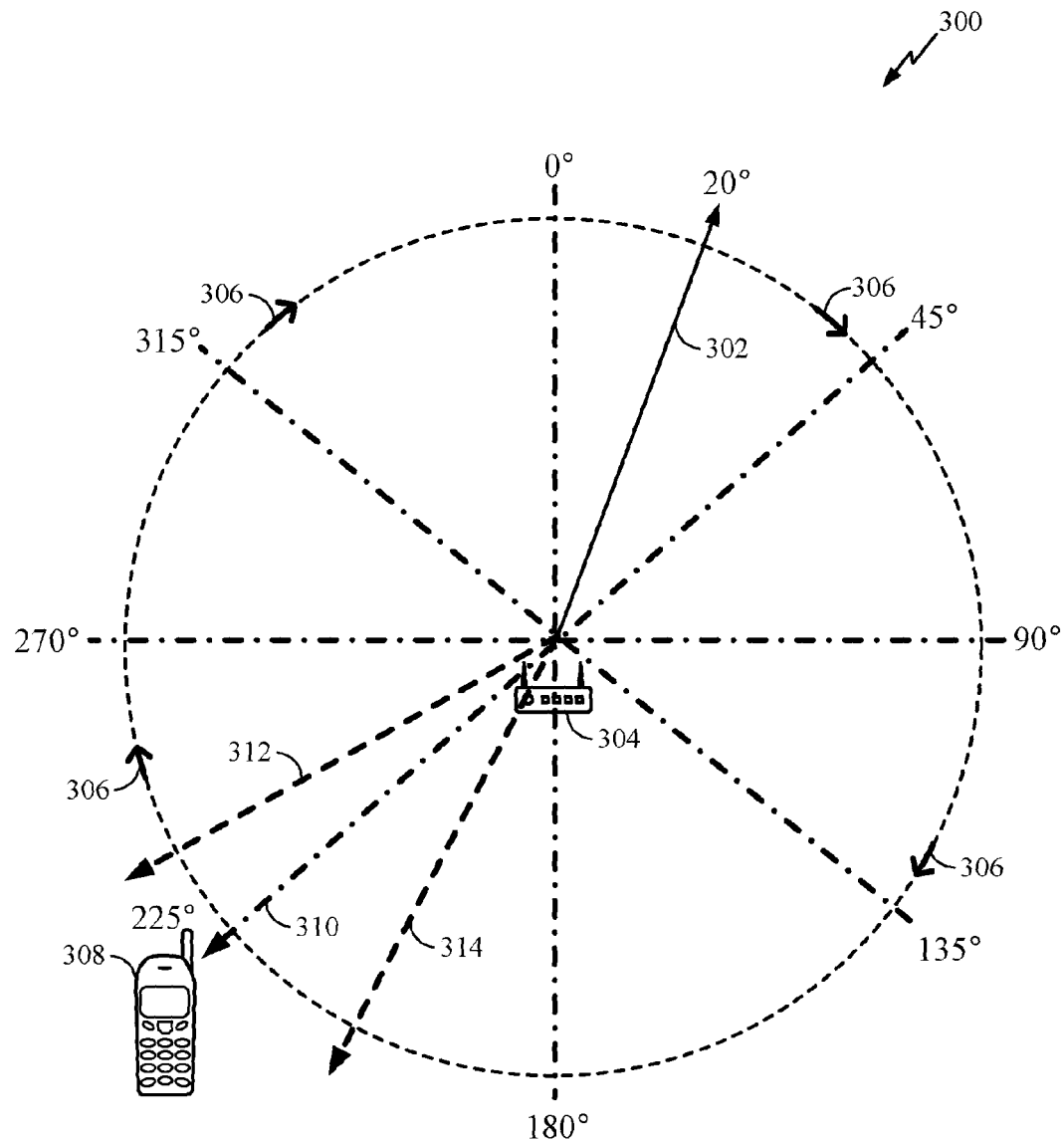
FIG. 3 is a schematic diagram illustrating an implementation of an example directed beam.

FIG. 3 is a schematic diagram 300 illustrating an implementation of an example directed beam 302 that may, for example, be formed by a single wireless transmitter 304 via a transmission of a wireless signal at a sequence of directional angles in a horizontal plane. At times, directed beam 302 may, for example, include one or more features or aspects of directed beam 226, 228, or 230 of FIG. 2. As seen, wireless transmitter 304, such as a WiFi access point, for example, and possibly corresponding to transmitter 204, 206 or 208 in FIG. 2, may comprise at least two antennas and may employ one or more beam forming techniques to direct or focus a transmission of a wireless signal (e.g., an HDP, PRS, etc.) over a narrow angle. As illustrated generally via arrows at 306, at times, directed beam 302 may be rotated in a circle by wireless transmitter 304, such as in a clockwise direction, for example, by changing suitable parameters (e.g., phase, amplitude, etc. for different antennas or antenna elements) used to control a beam forming angle. Beam rotation may allow a mobile device 308 (e.g. corresponding to mobile device 202 in FIG. 2) to measure times at which a received wireless signal is strongest, such as indicated via a directional angle 310 at 225 degrees, for example, and, thereby, obtain an angular direction from (or to) wireless transmitter 302, as discussed previously and further on. The terms "beam angle" and "directional angle" may be used interchangeably herein.

Depending on an implementation, a rotation of directed beam 302, such as implemented via a sequence of directional angles, for example, may be continuous or may occur as a series of discrete jumps, such as while wireless transmitter 304 directs beam 302 in a particular angle in a horizontal plane for a set duration (e.g. 50 ms, etc.) before changing direction. A sequence of directional angles may change continuously, such as between 0 and 360 degrees, for example, or may change by discrete values, such as in 5.0 degree increments, for example, though claimed subject matter is not so limited. As an example of the former, a beam angle that rotates clockwise may take the value (360*t/T) degrees in a clockwise direction from North at a time interval t following a time when the beam angle points North where T is the time interval for a complete 360 degree rotation. As an example of the latter, a rotation of directed beam 302 may comprise, for example, the following sequence of directional angles: 0, 5, 10, 15, 20, 25, 30, etc. degrees, such as in a clockwise direction from North. As another example of the latter, a rotation of directed beam 302 may comprise, for example, the following sequence of directional angles measured clockwise relative to North: 0, 90, 180, 270, 45, 135, 225, 315, 20, 110, 200 etc. degrees. In this example, the beam angle does not change by constant small values or continuously but instead changes by large values in order to coincide approximately with the direction of a mobile device such as mobile device 308 in a short period of time. A mobile device such as 308 could then measure or determine a maximum signal strength and thus a corresponding directional angle in a short period of time (e.g. 10-30 seconds) as opposed to waiting a longer time for a beam angle that increases (or decreases) by smaller discrete values or continuously to align with the direction of the mobile device. Even though a determined directional angle may then not be exactly correct when the beam angle is not exactly aligned with the direction of the mobile device relative to the transmitter, the faster time to determine the directional angle may enable faster triangulation of the location of the mobile device. A sequence of directional angles may change, for example, by a larger, smaller, or different amounts to cover a full circle more quickly, slowly, or differently. At times, smaller changes may allow for more accurate but slower measurement by mobile device 308, for example, whereas larger changes may allow for a faster but less accurate measurement. A particular sequence of directional angles, changing either continuously or by discrete amounts, could be represented by a single parameter (e.g. containing an integer value) or by a small number of parameters. For example, the sequence 0, 90, 180, 270, 45, 135, 225, 315, 20, 110, 200 etc. degrees referred to above might be identified (and thus represented) by convention by an identifier with an integer value 1, whereas the sequence 0, 5, 10, 15, 20, 25, 30, etc. degrees also referred to above might be identified and represented by an identifier with the integer value 2. Alternatively, a parameter may be provided that defines how the sequence may be generated—e.g. in the case of the sequence 0, 5, 10, 15, 20, 25, 30, etc. degrees, the parameter value could be 5 to indicate that the sequence of directional angles increase by 5 degrees from any one directional angle in the sequence to the next directional angle. The parameter(s) defining a sequence may be provided to a server and/or to a mobile device. For example, if parameters are provided that define the start time for a sequence, the time period for each angular direction and the sequence of angular directions, a mobile device or a server can determine the angular direction for any time after the start time.

In some implementations, if a mobile device 308 knows the frequency, times of transmission and coding sequence for the directed beam 302, it may not be necessary to encode at a transmitter and decode at a mobile device any information in the directed beam 302. Instead, a mobile device 308 may tune to the specific frequency, times of transmission and code sequence for the directional beam (e.g. by performing signal integration according to the code sequence used for the beam) and just measure the time when the directed beam 302 is received with maximum signal strength and/or maximum signal quality. Knowledge of the relationship between the directional angle of the directed beam 302 and the time of transmission may then be employed by a server or the mobile device 308 to determine the directional angle for the beam at the time of measured maximum signal strength and/or maximum signal quality.

In other implementations, as was indicated earlier, a reference signal, such as directed beam 302, may be encoded with an identity of wireless transmitter 304, a current angle of directed beam 302 (e.g., an angle of 225 degrees when the beam has the direction 310 in FIG. 3, etc.), or like parameters measurable or decodable by mobile device 308 in conditions under which a normal or typical signal level from wireless transmitter 304 may be insufficient to transmit information using other signals. Particular examples of encoding a reference signal will be described in greater detail below. Thus, in some instances, to improve accuracy of direction finding, mobile device 308 may measure signal strength and possibly signal quality for all or most directions of directed beam 302 for which directed beam 302 may be sufficiently measured or decoded.

At times, due, at least in part, to possible multipath or attenuation effects, a beam angle directed exactly in a direction of mobile device 308 (e.g., beam 310) that should have strongest detected signal strength may not necessarily have the strongest detected signal strength (and/or highest detected signal quality). For example, inside an office building or like cluttered environment, a directed beam (e.g., beam 310, etc.) may be attenuated or affected in some manner by intervening objects (e.g. walls, furniture, people, etc.). Furthermore, a directed beam transmitted in another direction (e.g., beam 302, 312, 314, etc.) may be reflected (e.g. by walls, furniture, etc.), for example, and encounter less attenuation from intervening objects and may have strongest detected signal strength at the mobile device 308. Consequently, a beam angle with strongest signal strength may not necessarily be directed exactly at mobile device 308 by wireless transmitter 304.

Accordingly, in an implementation, by evaluating signal strength for other beam angles of a transmitted reference signal and knowing a relationship of received signal strength in Line of Sight conditions (i.e. without multipath, attenuation and other impediments to signal propagation) to an offset angle between a beam direction and a true directional angle from the transmitter 304 to the mobile device 308, it may be possible to compute which acquired beam angle has the highest probability of aligning with the true directional angle. For example, in some instances, a relationship between the expected received signal strength at an offset angle to the intended (e.g. focused) direction of a beam and the received signal strength in the direction may be known via measurements and/or via calculation. As an example, if the transmitted beam angle is $\alpha$ (e.g. measured clockwise from North) and the offset angle to $\alpha$ is $\beta$, the relationship may be expressed as the ratio $(S1(\alpha,\beta)/S2(\alpha))$ where $S1(\alpha, \beta)$ is the measured or calculated signal strength or signal quality at an offset angle $\beta$ to the transmitted beam angle $\alpha$ and $S2(\alpha)$ is the measured or calculated signal strength or signal quality in the direction $\alpha$ of the transmitted beam. As an example, $\alpha$ may be the directional angle for the beam 314 shown in FIG. 3 whereas $\beta$ may coincide with the offset between the beam 314 and the beam 310. This ratio may be measured or calculated for a large number of angles $\alpha$ and $\beta$ (e.g. for values of $\alpha$ and $\beta$ each given by 0, 5, 10, 15, 20 degrees etc.). An expected relationship may be represented via a suitable signal strength ratio (as in the previous example involving $\alpha$ and $\beta$), signal strength difference, or the like. The relationship may be computed based on known characteristics of any method used to focus and direct a beam, on characteristics of the transmitter 304 and the antennas or antenna array used by the transmitter 304 and/or may be determined by measurement (e.g. in a lab) or by crowdsourcing measurements of received signal strength from the transmitter 304 from mobile devices at known locations and at known times to a server. The relationship may be represented by one or more mathematical functions and/or by a table or tables of values and/or in other ways. In an implementation, parameters may be defined that identify the relationship (e.g. identify one or more mathematical functions or preconfigured tables of values) and/or enable the relationship (e.g. the ratio of expected signal strength at some offset angle to a directional beam to the signal strength at a zero offset angle) to be generated (e.g. by applying some known or identified function) at a mobile device or a server. The parameters defining the relationship may then be provided by a server to a mobile device as assistance data and/or may be configured in the server for the associated wireless transmitter.

Mobile device 308 may measure the received signal strength and/or signal quality of the directional beam from transmitter 304 at a number of separate times corresponding to different directional angles. For example, mobile device 308 may measure the signal strength or signal quality of the directional beam corresponding to the directional angles 302, 310, 312, 314 shown in FIG. 3 and other directional angles not shown in FIG. 3. The directional angles for which the signal strength and/or signal quality is measured may be determined from information encoded by transmitter 304 in the directional beam that can be decoded by mobile device 308 (e.g. such as a directional angle itself) or may be determined from the time of signal measurement if the transmission times of different directional angles are known to the server or provided to the mobile device 308. Mobile device 308 or a location server with which mobile device 308 may communicate, may then correlate the measured signal strength to the expected signal strength for those beam angles that are measured for a given assumed true directional angle from transmitter 304 to mobile device 308. The expected signal strength may assume some fixed distance from transmitter 304 to mobile device 308 and some transmission power that may not necessarily be correct but may be sufficient to enable a correlation coefficient to be obtained—e.g. using Pearson's correlation coefficient. Such a correlation operation may be repeated for a number of different assumed true directional angles from transmitter 304 to mobile device 308. The assumed true directional angle that produces the highest correlation (e.g. the highest correlation coefficient) between the measured signal strength and/or signal quality and the expected signal strength and/or signal quality for all directional angles for which measurements were obtained by the mobile device 308 may then be taken as representing the most probable true directional angle. Of course, these are merely examples relating to improving accuracy of direction finding, and claimed subject matter is not so limited.

At times, a sequence of directional angles for beam 302 may target a most likely location of mobile device 308. The most likely direction may be determined from an approximate location estimate for mobile device 308 obtained by means other than measuring a rotating directed beam, such as by using a known location for mobile device 308 at a recent previous time or detection by mobile device 308 of signals from a transmitter nearby to mobile devive 308 (such as inferred from a small RTT measurement or a high RSSI or S/N measurement) whose known location may used an approximate location for mobile device 308. In some instances, such as if wireless transmitter 304 is wall-mounted, corner-installed, etc., beam 302 may be directed in one or more directions where a mobile device 308 would be most likely to receive the beam such as along a corridor or in a direction away from (and not through) a wall. In at least one implementation, to target a most likely location of mobile device 308, behavioral patterns of users of mobile devices tracked within an associated indoor or like area of interest, such as via one or more crowdsourcing techniques, for example, may also be used, whereby directional angles may target areas where users are commonly located (e.g. inside common areas, along corridors, in offices) as opposed to areas where users are not typically found (e.g. such as outside exterior walls or in areas occupied by machinery, elevator shafts etc.). Of course, these are merely examples relating to targeting a most likely or estimated location of mobile device 308, and claimed subject matter is not so limited.

When a sequence of directional angles for a beam 302 targets a most likely location of a mobile device 308 or an estimated location of a mobile device 308, the beam 302 may not be rotated in a circle or through a sequence of directional angles that uniformly encompass different directions around a circle (e.g. such as directional angles in the sequence 0, 5, 10, 15, 20, 25 . . . 355 degrees). Instead the directional angles may be associated with a limited range of angles. For example, a transmitter 304 that is located in the corner of a rectangular shaped building may restrict directional angles for a transmitted directed beam to lie within a 90 degree circular arc where the directional angles for the two bounding radii of the arc align with the two exterior walls of the building that meet at the corner where the transmitter 304 is located. This may be based on the likelihood that all or nearly all mobile devices that may receive the directional beams will be inside and not outside the building. This restriction of directional angles may speed up acquisition and measurement of the directed beam by a mobile device 308 by avoiding transmission using directional angles that do not typically align with the mobile device 308.

Referring back to example operating environment 200 of FIG. 2, at times, mobile device 202 may, for example, utilize a communication link 220 to access or obtain suitable information related to operating environment 200. For example, mobile device 202 may obtain or be provided (e.g., by servers 214, 216, 218, etc.) with positioning assistance data, such as identities or locations of wireless transmitters 204, 206, or 208, and details of directional beams from wireless transmitters 204, 206, 208 (e.g. frequencies, channels, times of transmission, coding sequence, relationship of directional angles to time of transmission). In some instances, a current orientation of one or more of wireless transmitters 204, 206, or 208 may also be provided or made available to mobile device 202 as part of positioning assistance data, for example, or may be encoded in an acquired reference signal, such as from wireless transmitters 204, 206, or 208. For example, as was indicated, a wireless signal may be encoded with an indication of a directional angle, such as a parameter indicating a starting time T1 and a possibly a rotation period T2 of a sequence of directional angles (e.g., at time t a directed beam may be pointing in a clockwise direction from North given by $(360*(t-T1)/T2)$ mod 360).

In some implementations, directional angles may be defined not relative to an absolute direction such as true North or magnetic North but relative to the orientation of the transmitter or the antennas or antenna array for the transmitter (such as transmitter 204, 206, 208 in FIG. 2 or transmitter 304 in FIG. 3). This may be a consequence of beam forming being supported by parameters (e.g. signal phase and amplitude) that are predefined for different antennas or antenna elements for different beam directions relative to the antenna positions or the antenna array. In at least one implementation, the orientation of a transmitter (e.g. transmitter 304) or of the antennas used by the transmitter may be determined by the transmitter using a compass, gyroscope, magnetometer or some other inertial sensor or sensors associated with (e.g. contained inside) the transmitter or otherwise fixed relative to the antennas or antenna array used by the transmitter. The orientation may be encoded in the directed beam and/or may be provided by a separate signal from the transmitter that can be received by a mobile device such as mobile device 308 and/or may be provided to server such as server 214, 216 or 218. The server or mobile device may use the orientation to adjust the directional angle. For example, if the directional angle is given as or calculated to be X degrees expressed clockwise relative to the orientation of the transmitter (or the antennas for the transmitter) and the orientation is measured by the transmitter to be Y degrees expressed clockwise relative to North, then a server or mobile device may adjust the directional angle to be ((X+Y) mod 360) degrees expressed clockwise relative to North.

At times, a current orientation of a particular source wireless transmitter (or the antennas of the source wireless transmitter) may also be determined by measuring a directed beam (e.g. containing a reference signal) at one or more other wireless devices whose locations relative to the source wireless transmitter may be known (e.g. due to knowing the location of the source wireless transmitter and the locations of the other wireless transmitters). The wireless devices that measure the directed beam may comprise other wireless transmitters (e.g. one or more of transmitters 204, 206 and 208 in FIG. 2) at known locations or one or more mobile devices (e.g. mobile device 202) whose location can be determined by other means (e.g. using A-GNSS positioning). A wireless device that measures the directional beam may determine a directional angle from the source wireless transmitter as described previously by finding a most probable directional angle associated with a strongest received signal or a most probable directional angle that provides the highest correlation of measured signal strength or signal quality to expected signal strength or signal quality. This directional angle may be determined by the wireless device that performs the measurements if the device has sufficient information for or from the source transmitter (e.g. starting time of beam rotation or encoded angle within the beam) or may be performed by a server to which the wireless device performing the measurements sends the measurement information. When the locations of the source wireless transmitter and the wireless device making the measurements are known, the true directional angle A (e.g. expressed clockwise from North) from the source wireless transmitter to the wireless device making the measurements is easily obtained. If the measured directional angle relative to the orientation of the source transmitter is B (e.g. expressed in a clockwise direction), then the orientation of the source wireless transmitter may be obtained by combining A and B—e.g. may be given by (A-B) mod 360, expressed clockwise from North. The orientation may be obtained in this manner by measuring the directional beam from the source wireless transmitter at several or many different wireless devices (e.g. mobile devices or wireless transmitters) at known locations and with the resulting estimates for the orientation being combined—e.g. via averaging—to produce a more accurate and reliable orientation. The process may also be repeated at later times to detect possible changes in the orientation of a source wireless transmitter—e.g. due to the wireless transmitter being moved deliberately or accidentally.

Figure 4:
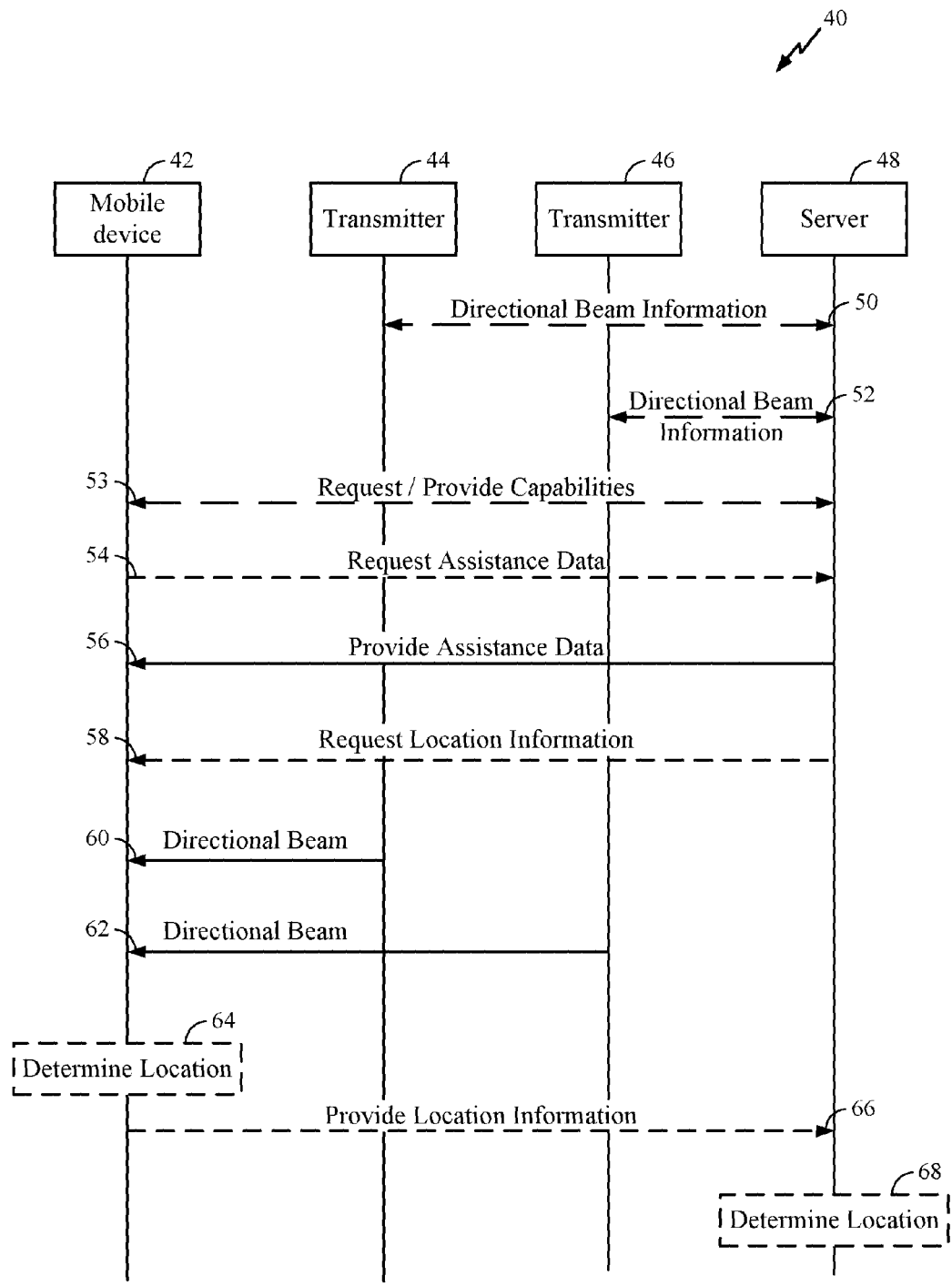
FIG. 4 is a message flow diagram for a process illustrating an implementation of location support using an example directed beam.

FIG. 4 illustrates a process for determining the location of a mobile device by measurement of directional beams transmitted from one or more wireless transmitters according to some of the examples described earlier herein. The process 40 describes the contributions to locating the mobile device that may be provided by the mobile device, one or more wireless transmitters and a server. Process 40 includes a mobile device 42 that may correspond to mobile device 102 in FIG. 1, mobile device 202 in FIG. 2 or mobile device 308 in FIG. 3. Process 40 also includes wireless transmitters 44 and 46 that may each correspond to any of local area transceiver 112 or base station transceiver 108 in FIG. 1, wireless transmitters 204, 206 or 208 in FIG. 2, or wireless transmitter 304 in FIG. 3. Process 40 further includes a server 48 that may correspond to any of servers 116, 118 or 120 in FIG. 1 or any of servers 214, 216 or 218 in FIG. 2. Furthermore, server 48 may be a SUPL SLP (e.g. H-SLP or D-SLP) or a 3GPP Enhanced Serving Mobile Location Center (E-SMLC); and each of wireless transmitters 44 and 46 may be a WiFi AP, Bluetooth AP or LTE femtocell, The steps shown in FIG. 4 for process 40 may occur in a different order than that shown and may occur serially or in parallel. In addition, some of the steps may be omitted in certain embodiments and/or additional steps, not shown in FIG. 4, may in some cases be added. In addition, other wireless transmitters not shown in FIG. 4 may participate in process 40 and, for example, transmit a directional beam whose directional angle may be measured by mobile device 42.

Process 40 may start at step 50 wherein transmitter 44 and server 48 may exchange information related to directional beam transmission from transmitter 44. For example, server 48 may send information to transmitter 44 to configure information in transmitter 44 related to transmission of a directional beam from transmitter 44. The information may define or specify a type of HDP or PRS signal to be transmitted (e.g. may provide information on the channel, frequency, encoding and/or transmission power of the PRS or HDP signal). The information may also specify parameters (e.g. signal phase and amplitude) for producing a directional beam from multiple antennas or from an antenna array. The information may further define a sequence of directional angles for the directional beam such as specifying a starting time for beam rotation, an angular speed or period of rotation and a direction (e.g. clockwise or counterclockwise) for continuous rotation, or a sequence of discrete angles and a period of transmission for each angle when beam rotation is via a sequence of discrete angles. The transmitter 44 may then transmit a directional beam including rotating the beam through a sequence of directional angles according to the information configured at step 50. For example, the directional beam received at step 60 by mobile device 42 may be transmitted according to the information configured at step 50. In an alternative embodiment, instead of configuring information in transmitter 44 at step 50, transmitter 44 may send information to server 48 at step 50 related to directional beam transmission from transmitter 44. The information that is sent may have been previously configured in transmitter 44 (e.g. by an Operations and Maintenance Center) and/or may be hardcoded in transmitter 44 (e.g. stored in firmware). The information may be the same as or a subset of that previously described for the case that information is configured in transmitter 44 by server 48. In some embodiments, server 48 may request information from transmitter 44 at step 50 prior to transmitter 44 sending information to server 48 related to directional beam transmission from transmitter 44. In some embodiments, the information exchanged at step 50 may be exchanged using the LPPa protocol defined by 3GPP in 3GPP specification 36.455.

At step 52 in process 40, transmitter 46 and server 48 may exchange information related to directional beam transmission from transmitter 46. The information exchange may be similar to or the same as that described previously for step 50 except that the information may relate to directional beam transmission from transmitter 46 instead of from transmitter 44. Steps similar to or the same as steps 50 and 52 (not shown in FIG. 4) may also occur to enable server 48 to exchange information related to directional beam transmission from other transmitters not shown in FIG. 4.

At step 53, the server 48 may request the capabilities of the mobile device 42—e.g. the capabilities of the mobile device 42 to receive and make use of assistance data such as that sent at step 56 and/or to provide location information such as that sent at step 66. Mobile device 42 may send its capabilities to server 48 if requested at step 53 or may send its capabilities without such a request. Step 53 is optional and may not occur in all embodiments.

At step 54, mobile device 42 may send a request to server 48 for assistance data related to measurement of directional beams from transmitters 44 and/or 46 and possibly from other transmitters not shown in FIG. 4. The request in step 54 may specify the type of assistance requested—e.g. information on PRS or HDP signals being transmitted and information on directional beam rotation. In some embodiments, step 54 may be omitted.

At step 56, server 48 may send assistance data to mobile device 42 related to directional beam transmission from transmitters 44, 46 and possibly other transmitters not shown in FIG. 4. In one embodiment, the assistance data may correspond to assistance data requested by mobile device 42 in step 54. In another embodiment, the assistance data may be sent by server 48 in the absence of a request at step 54 but possibly in conformance to any capabilities of mobile device 42 sent to server 48 at step 53. For example, if some external client (not shown in FIG. 4) has requested the location of mobile device 42 and the request is passed to server 48 (e.g. by a network such as network 122), server 48 may send assistance data to mobile device 42 at step 56 without any request from mobile device 42 and then request location information at step 58 as described later. The assistance data transferred at step 56 may include information referred to elsewhere herein that a mobile device may need or make use of in order to measure a directional beam from a wireless transmitter (such as transmitter 44 or 46 in FIG. 4), determine a directional angle for the directional beam and determine a location for the mobile device 42 using the directional angle. The information in the assistance data may thus comprise one or more of the following for each of one or more transmitters such as transmitter 44 and transmitter 46: (i) the identity and/or location of the transmitter; (ii) characteristics of an HDP or PRS signal transmitted from the transmitter including any channel being used, a frequency or frequencies being used, an identification of a sequence of bits or symbols being transmitted, an identification of an encoded sequence of transmitted bits or symbols that are orthogonal to some or all encoded sequences of bits or symbols transmitted by other transmitters; (iii) characteristics of a directed beam such as antenna characteristics and beam forming parameters or expected beam signal strength as a function of an intended beam direction and an offset angle from the intended beam direction (e.g. main beam lobe); and (iv) parameters defining rotation in a horizontal plane of the directed beam which may include a sequence of directional angles for the directional beam such as specifying a starting time for beam rotation, an angular speed or period of rotation and a direction (e.g. clockwise or counterclockwise) for continuous rotation, or a sequence of discrete angles and a period of transmission for each angle when beam rotation is via a sequence of discrete angles. The mobile device 42 may store and subsequently use the assistance data received at step 56 to acquire and measure a directional beam for each transmitter or for some transmitters for which assistance data is provided at step 56—e.g. as described later for steps 60 and 62. In some embodiments, the assistance data transferred at step 56 may contain information that may enable mobile device 42 to (i) obtain other location related measurements such as measurements for OTDOA positioning, RTT or RSSI measurement and (ii) possibly compute a location estimate using these measurements as referred to herein further on.

At step 58, server 48 may send a request to mobile device 42 for either location measurements or a location estimate for mobile device 42. Location measurements, if requested, may refer to measurements of directional angles from transmitters 44 and 46 and possibly from other transmitters. The requested location information (either measurements or a location estimate) may correspond to any capabilities of mobile device 42 that may have been reported by mobile device 42 to server 48 at step 53. Step 58 is optional and may not occur in all embodiments.

At step 60, mobile device 42 may acquire and measure one or more parameters for a directional beam transmitted by transmitter 44. Mobile device may use the measured parameters to determine a directional angle or a most probable directional angle for the directional beam received from transmitter 44. Mobile device 42 may employ the assistance data received at step 56 to acquire and/or measure the directional beam and/or to determine a directional angle. The determination of the directional angle may be as described elsewhere herein for the operating environment 200 of FIG. 2 and/or the schematic diagram 300 of FIG. 3.

At step 62, mobile device 42 may acquire and measure one or more parameters for a directional beam transmitted by transmitter 46. Step 62 may be performed in an analogous manner to step 60. Mobile device 42 may also acquire and measure directional beams for other transmitters not shown in FIG. 4 and determine directional angles for these transmitters in a like manner.

At step 64, mobile device 42 may use any directional angles determined at steps 60 and 62 (and at other steps not shown in FIG. 4 for other transmitters not shown in FIG. 4) to help determine the location of mobile device 42. For example, the mobile device may use triangulation as described earlier herein in association with operating environment 200 for FIG. 2. Mobile device 42 may also use other measurement information (e.g., OTDOA or RTT measurements if obtained at steps 60 and 62) combined with measurements of directional angles to help determine the location of mobile device 42. Step 64 is optional and may not occur in all embodiments—e.g. may not occur if step 58 occurs and server 48 requests measurements rather than a location estimate at step 58.

At step 66, mobile device 42 may send any measurements for directional angles obtained at steps 60 and 62 to server 48 and/or may send any location estimate for mobile device 42 determined at step 64 if step 64 occurs. Step 66 is optional and may occur, for example, if step 58 occurs.

If step 66 occurs, server 48 may determine a location estimate for mobile device 42 at step 68—e.g. using information already configured in server 48 for transmitters 44 and 46 or obtained from transmitters 44 and 46 at steps 50 and 52. Step 68 is optional and may occur if server 48 receives measurements for directional angles for transmitters 44 and 46 from mobile device 42 at step 66 rather than a location estimate. Server 48 may use the same techniques as mobile device 42 may use at step 64 to determine a location estimate for mobile device 42—e.g. may use triangulation as described for operating environment 200 of FIG. 2.

In some embodiments of the process 40, mobile device 42 may perform other location measurements following step 56 or step 58 (if step 58 occurs) that are not illustrated in FIG. 4. Mobile device 42 may also make use of any assistance data received at step 56 to obtain these other measurements. The measurements may include OTDOA measurements, RTT measurements or RSSI measurements associated with pattern matching as well as other measurements. These other measurements may be used at step 64, if step 64 occurs, to help determine a location of mobile device 42 or may be transferred to server 48 at step 66, if step 66 occurs, to help enable server 48 to determine a location of mobile device 42 at step 68. These other measurements may enable location of mobile device 42 using most probable directional angles (e.g. obtained by mobile device 42 at steps 60 and 62) combined with location measurements for OTDOA, RTT and/or RSSI, as described herein further on. These other measurements may also allow location of mobile device 42 without any directional angles if mobile device 42 does not determine (e.g. is unable to determine) most probable directional angles at steps 60 and 62.

In some embodiments, the messages or signals transmitted at any or all of steps 53, 54, 56, 58 and 66 may be messages or signals for the 3GPP LPP positioning protocol defined in 3GPP specification 36.355, the OMA LPP Extensions (LPPe) protocol or for the LPP protocol combined with the LPPe protocol (LPP/LPPe). In some embodiments, the messages or signals transmitted at any or all of steps 53, 54, 56, 58 and 66 may be transferred as part of a SUPL session between mobile device 42 and server 48 or as part of a control plane session—e.g. according to the 3GPP control plane solution for LTE defined in 3GPP specifications 23.271 and 36.305.

A important aspect of the process 40 described earlier in association with FIG. 4, the operating environment 200 described earlier in association with FIG. 2 and the directed beam 302 described earlier in association with FIG. 3 may be the ability of a mobile device (e.g. mobile device 42 in FIG. 4, mobile device 202 in FIG. 2 or mobile device 308 in FIG. 3) to determine a most probable directional angle associated with a directional beam transmitted from some wireless transmitter such as transmitter 44 or 46 in FIG. 4, transmitter 204, 206 or 208 in FIG. 2, or transmitter 304 in FIG. 3. The directional angle may provide the angle of the mobile device as seen at the transmitter relative to either some absolute direction (e.g. geographic North or magnetic North) or the current orientation of the transmitter. Normally (e.g. in line of sight conditions), the directed beam will have a strongest signal and/or highest signal quality (e.g. highest S/N ratio) when the directed beam (e.g. center of the main lobe of the directed beam) is aimed exactly in the direction of the mobile device from the transmitter. However, impediments to transmission (e.g. buildings, hills, walls, other objects) may create conditions in which a stronger and/or higher quality signal may be received at the mobile device when the directed beam is directed in some other direction and not exactly in the direction of the mobile device. As described previously, a mobile device can still make measurements of the signal strength and/or signal quality of the received directional beam for a number of different directional angles. These measurements may them be correlated with expected signal strength measurements and/or expected signal quality measurements for different assumed directional angles for the mobile device with the directional angle that yields the highest correlation being taken as the most probable directional angle. The correlation may be performed at the mobile device—e.g. if a server (e.g. server 48 in FIG. 4) provides assistance data to the mobile device containing either the expected measurements as a function of a directional angle and offset angle or data (e.g. parameters or a function definition) that allow the mobile device to calculate the expected measurements. The correlation may also be performed at a server (e.g. server 48 in FIG. 4) if the mobile device provides the measurements of signal strength and/or signal quality to the server for different directional angles. Whether either a strongest signal strength or highest signal quality is used to determine a directional angle with highest probability or a highest correlation of measured signal strength or signal quality to expected signal strength or signal quality as just described, a mobile device or server needs to be able to associate a measurement of a directed beam with an associated directional angle.

In one embodiment as already mentioned, a directional angle (e.g. 0 degrees, 45 degrees 180 degrees) may be encoded in the directional beam itself—e.g. using coding redundancy and forward error correction to improve the probability of successful decoding. This embodiment may be useful when a directional beam changes by discrete amounts (e.g. increases in 5 degree increments) and has a constant angle for a short period (e.g. 10 ms to 100 ms) during which time a mobile device can measure the signal strength and decode the directional angle. In this case, the identity of the transmitter may also be encoded in the directional beam and decoded by the mobile device along with the directional angle. In some embodiments, a directional angle may not be directly encoded in the directional beam, but may be encoded by some other parameter (e.g. a relative time of transmission or sequence number indicating a particular directional angle in a predefined sequence of directional angles) from which the directional angle may be calculated or otherwise inferred by a mobile device or by a server.

In another embodiment, the mobile device may infer the identity of the transmitter from characteristics of the directional beam, as described previously, such as from use of a distinct channel, frequency, set of frequencies, time of transmission and/or beam encoding that are used for the directional beam and differ from those used for directional beams transmitted by other transmitters nearby that may also be received by the mobile device. A server may provide assistance data to the mobile device and inform the mobile device of the distinct characteristics of the directional beams transmitted by different transmitters to enable the mobile device to determine the transmitter for each received directional beam without needing an explicit transmitter identity to be encoded in the beam. In another implementation, a directional angle for a directed beam may be inferred from the time of transmission and reception. In one implementation, a sequence of directional angles, either discrete or continuous angles, may be associated with specific times such that any specific directional angle be associated with a specific time or time period. For example, if directional angles change continuously and at a constant angular speed, a current directional angle $\alpha$ ($0 \leq \alpha \leq 360$) measured clockwise relative to geographic North may occur at a time ($\alpha T/360$) after the beam commences rotation in a clockwise direction from North or at a time (($360-\alpha)T/360$) after the beam commences rotation in a counterclockwise direction from geographic North, where T is the period of 360 degree beam rotation. Similarly, if a directional beam changes through a sequence of discrete directional angles {$\alpha 1, \alpha 2, \alpha 3, \ldots \alpha N$}, where each angle has a duration of t, any particular angle $\alpha j$ ($1 \leq j \leq N$) may occur during a period starting at $(j-1)*t$ and ending at $j*t$ after the directional beam commences to change through the sequence of directional angles. A current directional angle may thereby have a time relationship to the start of beam rotation or the start of a sequence of discrete directional angles. Consequently, a current directional angle may be inferred from a time of transmission or reception for a directional beam and a start time for rotation or a sequence of directional angels for a directional beam. If a mobile device and a transmitter are able to use a common time reference (e.g. GPS time) and a mobile device knows the start time for a current rotation or current sequence of angles for a directional beam as well as the period (e.g. T or t in the previous examples) and any sequence of directional angles (e.g. α1, α2, α3, . . . αN above), the mobile device can infer a directional angle for any particular time of reception of the directed beam. The parameters for the directional beam (e.g. period t or T, and any sequence of directional angles such as α1, α2, α3, , , , αN) may be provided for a particular transmitter to a mobile device as assistance data, thereby allowing a mobile device to determine a directional angle itself if the start time is known. Alternatively, a mobile device may measure the time of reception itself and provide this to a server along with any other measurements to allow the server to determine the directional angle from the time of reception. The start time of a current rotation (or sequence of directional angles) for a directed beam may be encoded in the directional beam or may be provided separately by a server to a mobile device. The start time may be periodic in some implementations (e.g. occur at times T, 2T, 3T etc.) or may just be provided (e.g. encoded within a directional beam) for a current rotation or current sequence of directional angles.

In some embodiments, a transmitter may transmit a directional beam at a constant angular speed or as a sequence of discrete directional angles each with a constant period allowing a mobile device or a server to infer a current directional angle from a current time of reception as just described. However, the timing used by the transmitter may not align with some global time like GPS but may instead be local to the transmitter. In that case, a mobile device may still measure some global time (e.g. GPS time) or other known reference time (e.g. time relative to a base station such as base station transceiver 108 in FIG. 1) corresponding to a particular time of reception for a most probable directional angle of a directed beam and send this to a server. One or more measurement units (e.g. other mobile devices at known positions and or one or more other transmitters at known positions) may also measure the directed beam from the transmitter and may determine an absolute time (e.g. GPS time) or a time relative to some other reference source (e.g. a base station transmission time) corresponding to a most probable directional angle from the transmitter to the measurement unit. The technique for determining the most probable directional angle may be the same as that used by the mobile device—e.g. using a strongest received signal or highest signal quality or highest correlation of measured to expected signal strength or quality. Because the locations of the measurement unit and transmitter may both be known, the true direction of the measurement unit from the transmitter can be known allowing an association of the true directional angle for the directed beam to global time or some other reference time (e.g. transmission time at a nearby base station) to be obtained by the server. The server can then use this measured association to infer the directional angle from a reception time for the most probable directional angle reported by a mobile device. The same can also be done if a mobile device reports measurements of signal strength and/or signal quality for a directional beam for different directional angles, each represented by a different time of reception, and the server needs to obtain the most probable directional angle via obtaining a maximum correlation of measured to expected signal strength and/or signal quality.

As an example of this embodiment, assume that a directed beam is rotated at a constant angular speed in a clockwise direction by a transmitter A and starts a new rotation at a global time T1. At some later time T2, the angle of the directional beam may be 360*(T2−T1)/T where T is the period of rotation. Suppose a mobile device B determines that the most probably directional angle for the beam occurs at a global time of T3. The mobile device may not be able to determine the directional angle corresponding to T3 even if provided with the period T because the global starting time T1 may not be known. However, if a measurement unit C is able to determine that the most probable directional angle from the transmitter A to the measurement unit C occurs at a global time T4, then the measurement unit C or server may determine the starting time T1 from any known directional angle θ from the transmitter A to the measurement unit C (e.g. derived from their respective known locations) using the following equation.

$$\theta = 360(T4-T1)/T \qquad (1)$$

The directional angle δ from the transmitter A to the mobile device B may then be obtained from the measured time T3 as follows.

$$\delta = 360(T3-T1)/T \qquad (2)$$

Even though a certain number of computing platforms or devices are illustrated herein, any number of suitable computing platforms or devices may be implemented to facilitate or support one or more techniques or processes associated with operating environment 200 or process 40. For example, at times, network 212 may be coupled to one or more wired or wireless communications networks (e.g., WLAN, etc.) so as to enhance a coverage area for communications with mobile device 202, one or more wireless transmitters 204, 206, or 208, servers 214, 216, or 218, or the like. In some instances, network 212 may facilitate or support femtocell-based operative regions of coverage, for example. Again, these are merely example implementations, and claimed subject matter is not limited in this regard.

Figure 5:
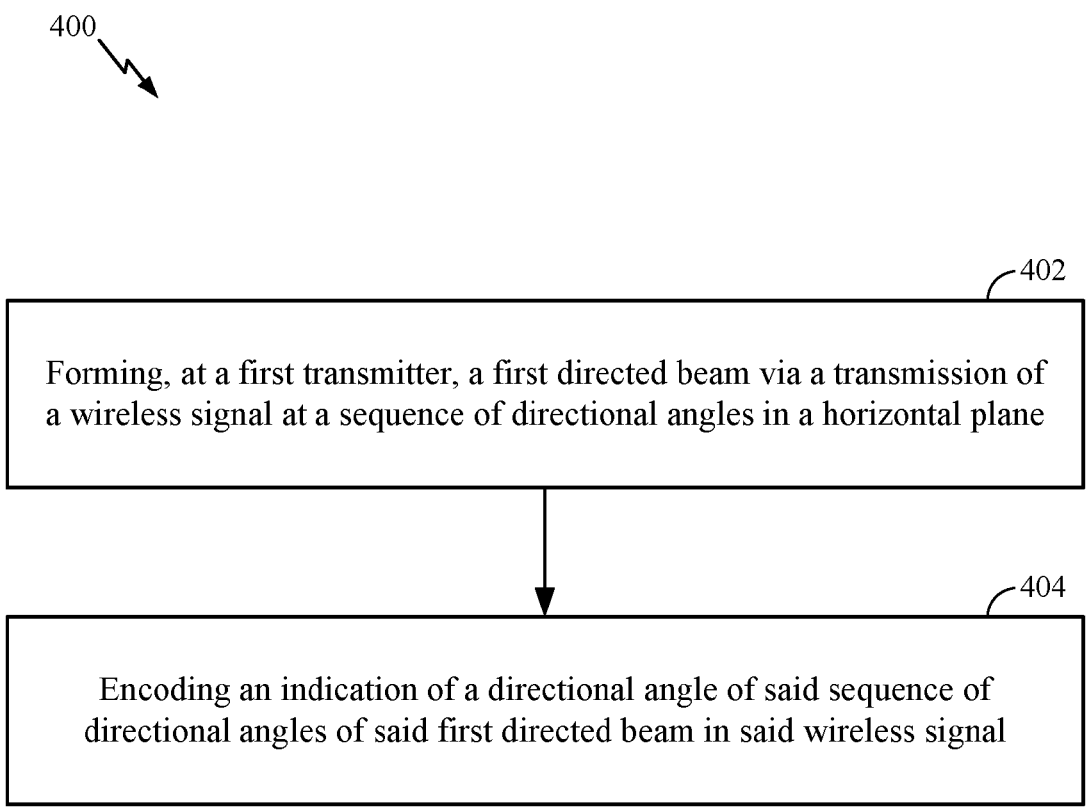
FIG. 5 is a flow diagram illustrating an implementation of an example process for utilizing a reference signal for indoor positioning.

Attention is now drawn to FIG. 5, which is a flow diagram illustrating an implementation of an example process 400 that may be performed, in whole or in part, to facilitate or support one or more operations or techniques for utilizing a reference signal for indoor positioning for use in or with a mobile device, such as mobile device 102 of FIG. 1, mobile device 202 of FIG. 2, mobile device 308 of FIG. 3 or mobile device 42 of FIG. 4, for example. It should be noted that information acquired or produced, such as, for example, input signals, output signals, operations, results, etc. associated with example process 400 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 400 may, for example, begin at operation 402 with forming, at a first transmitter, a first directed beam via a transmission of a wireless signal at a sequence of directional angles in a horizontal plane. The first transmitter may correspond to local transceiver 112 in FIG. 1, base station transceiver 108 in FIG. 1, any of transmitters 204, 206 and 208 in FIG. 2, wireless transmitter 304 in FIG. 3 or either of transmitters 44 and 46 in FIG. 4.

With regard to operation 404, an indication of a directional angle from a sequence of directional angles of the first directed beam may, for example, be encoded in a transmitted wireless signal from the first wireless transmitter. The encoded indication of a current directional angle may allow a recipient mobile device to determine a directional angle or a most probable directional angle from the first wireless transmitter to the recipient mobile device and thereby determine or help determine the location of the recipient mobile device—e.g. using triangulation.

In an embodiment, the wireless signal that is transmitted at operation 402 may comprise an HDP signal, a PRS signal or some other reference signal possessing better propagation and hearability characteristics than a normal signal (e.g. used to transfer voice or data content) transmitted from the first transmitter. The wireless signal that is transmitted at operation 402 may further comprise one or more of the following characteristics: a higher transmission power than that for other signals transmitted by the first transmitter; a different channel than that for other signals transmitted by the first transmitter; a signal modulation and encoding with better propagation (or lesser attenuation or lower attenuation factor) than that for other signals transmitted by the first transmitter; a known sequence of bits or symbols that may be received and coherently integrated over time by a mobile device; a muting by other transmitters during the transmission by the first transmitter; or a bit or symbol encoding sequence that is orthogonal to the encoding sequence used for other reference signals transmitted by the first transmitter and/or reference signals transmitted by one or more other transmitters. As discussed above, the first wireless transmitter may employ a beam forming technique so as to focus the wireless signal transmitted at operation 402 over a relatively narrow directional angle. The wireless signal (e.g. any reference signal contained in the wireless signal) may, for example, be "virtually" or electronically rotated, such as via a suitable sequence of directional angles in a clockwise direction, counterclockwise direction, or any combination thereof. Rotation of a reference signal may, for example, allow a recipient mobile device to measure a stronger signal and, thereby, obtain or determine a directional angle or a most probable directional angle to or from the first wireless transmitter. At times, a sequence of directional angles may, for example, target a most likely or estimated location of a mobile device. The sequence of directional angles may comprise any of: a plurality of angles that change by discrete values; a plurality of angles that change continuously between 0 and 360 degrees; or any combination thereof. The sequence of directional angles may further be represented by positive changes, negative changes or both. For example, when directional angles progressively increase in a clockwise direction either by discrete or continuous amounts (such as in the sequence 0, 5, 10, 15, 20, 25 . . . degrees), the changes may all be positive. When directional angles progressively decrease in a counterclockwise direction (such as in the sequence 360, 355, 350, 345, 340, 335 . . . degrees), the changes may all be negative. And when directional angles alternately increase and decrease in both clockwise and counterclockwise directions (such as in the sequence 0, 180, 90, 270, 45, 315 . . . etc.), the changes may be both positive and negative. The sequence of directional angles may further rotate the directed beam around a circle in a clockwise direction, counterclockwise direction or both directions. The transmission of the first directed beam at operation 402 and the sequence of directional angles may be enabled by use of a phase array antenna at the first transmitter.

In an embodiment, the indication of a directional angle that is encoded at operation 404 in the first directed beam may comprise any of: a parameter indicating a starting time of the sequence of directional angles; a current directional angle; or any combination thereof. The current directional angle may be relative to any of: an absolute geographic direction (e.g. true North, East, West or South), a magnetic direction (e.g. magnetic North) or a current orientation of the first transmitter. In an embodiment, an identifier of the first transmitter may be encoded in the directed beam. The identifier may be a media access control (MAC) address; a local ID; a network access ID; a cell ID; or any combination thereof. The identifier may enable a recipient mobile device to identify the first transmitter and thereby, for example, determine properties of the first transmitter (such as its location and sequence of directional angles) that may have been previously provided to the recipient mobile device by a server.

Figure 6:
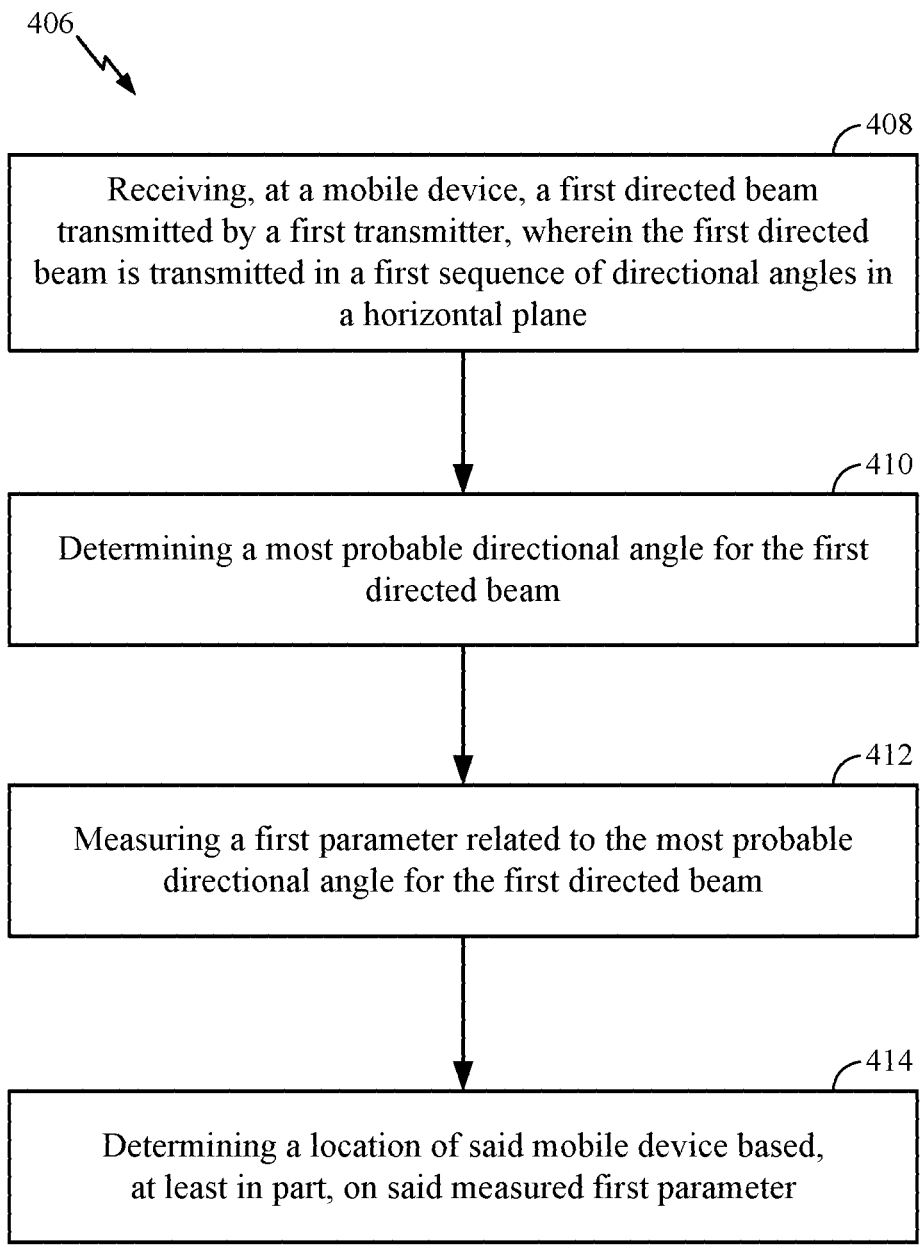
FIG. 6 is a flow diagram illustrating another implementation of an example process for utilizing a reference signal for indoor positioning.

Attention is now drawn to FIG. 6, which is a flow diagram illustrating an implementation of an example process 406 that may be performed, in whole or in part, to facilitate or support one or more operations or techniques for utilizing a reference signal for indoor positioning for use in or with a mobile device, such as mobile device 102 of FIG. 1, mobile device 202 of FIG. 2, mobile device 308 of FIG. 3 or mobile device 42 of FIG. 4, for example. Likewise, here, it should be noted that information acquired or produced, such as, for example, input signals, output signals, operations, results, etc. associated with example process 406 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 406 may, for example, begin at operation 408 with receiving, at a mobile device, a first directed beam transmitted by a first transmitter, wherein the first directed beam is transmitted in a first sequence of directional angles in a horizontal plane. As discussed above, at times, the first directed beam may, for example, be "virtually" or electronically rotated, such as by a transmitter via a suitable sequence of directional angles in a clockwise direction, counterclockwise direction, or any combination thereof. In some instances, the first sequence of directional angles may, for example, target a most likely or estimated location of the mobile device, such as a certain distance or number of degrees away from a wall, particular direction, etc., as was also indicated.

With regard to operation 410, the mobile device may determine a most probable directional angle for the first directed beam as described earlier in association with FIGS. 2 and 3—for example, by determining a maximum signal strength (e.g. maximum RSSI), maximum signal quality (e.g. maximum S/N) or highest correlation of measured to expected signal strength or signal quality.

At operation 412, the mobile device may measure a first parameter related to the most probable directional angle for the first directed beam. For example, as also discussed above, the first parameter may comprise an indication of a directional angle of a sequence of directional angles of the first directed beam and may be encoded in the first directed beam transmitted by the first transmitter. The first parameter may also comprise a starting time for the sequence of directional angles that may be encoded in the first directed beam and/or may comprise a measurement time (e.g. defined according to a global system time such as GPS time or defined using a local reference time such as according to the transmission timing of a nearby base station). The first parameter may also or instead comprise a sequence number identifying a particular reference signal occurrence (e.g., lasting 10-100 ms, etc.) that may be encoded in the first directed beam and may identify the occurrence of a particular angular direction for the first directed beam. For example, the sequence number may be an integer J in the range 1 to N identifying the occurrence of an angular direction $\alpha J$ in the sequence of directional angles $\{\alpha1, \alpha2, \alpha3, \ldots \alpha N\}$. As was indicated, at times, an identifier of the first transmitter may, for example, be also encoded in the first directed beam.

At operation 414, a location of the mobile device may be determined based on the measured first parameter by the mobile device—for example using triangulation as described earlier in association with FIG. 2.

In some embodiments, the most probable directional angle determined at operation 410 may correspond to at least one of: a maximum received signal strength measured by the mobile device for the first directed beam; a maximum received signal quality for the first directed beam measured by the mobile device; a maximum correlation of received signal strength for the first directed beam with an expected signal strength for the first directed beam assuming a most probable directional angle; or a maximum correlation of received signal quality for the first directed beam with an expected signal quality for the first directed beam assuming a most probable directional angle.

In an embodiment, the first parameter that is measured at operation 412 may comprise at least one of the following: a time of arrival (TOA) of the first directed beam; a directional angle encoded in the first directed beam; an identification for the first transmitter; or any combination thereof.

In an embodiment, the process 406 may further comprise receiving a second directed beam at the mobile device transmitted by a second transmitter, wherein the second directed beam is transmitted in a second sequence of directional angles in a horizontal plane; determining a most probable directional angle for the second directed beam; measuring a second parameter related to the most probable directional angle for the second directed beam; and determining a location of the mobile device based, at least in part, on the measured first parameter and the measured second parameter.

In an embodiment, the first directed beam may comprise an HDP signal, a PRS signal or some other reference signal. The reference signal may comprise one or more of the following characteristics: a higher transmission power than that for other signals transmitted by the first transmitter; a different channel than that for other signals transmitted by the first transmitter; a signal modulation and encoding with better propagation (or lesser attenuation or lower attenuation factor) than that for other signals transmitted by the first transmitter; a known sequence of bits or symbols that may be received and coherently integrated over time by the mobile device; a muting by other transmitters during the transmission by the first transmitter; or a bit or symbol encoding sequence that is orthogonal to the encoding sequence used for other reference signals transmitted by the first transmitter and/or reference signals transm a sequence of horizontal directional angles for a fixed vertical directional angle followed by the same sequence of horizontal ditrectional angles for other fized vertical directional angles itted by one or more other transmitters.

The description of examples of the method so far included herein (e.g. description in association with FIGS. 1-6) may enable a location of a mobile device to be obtained using a reference signal (e.g. an HDP or PRS signal) that may be a directed beam that is rotated through a sequence of directional angles in a horizontal plane. Positioning of a mobile device may then comprise determining one or more directional angles or most probable directional angles to or from one or more transmitters and determining a location of the mobile device using, for example, triangulation (e.g. based on known locations for the one or more transmitters). In a further embodiment, a directed beam may be transmitted in directions other than in a horizontal plane. For example, a directed beam may be transmitted at different vertical directional angles $\sigma$ to a horizontal plane such as at vertical directional angles $\sigma$ in a range of $-\theta1$ to $+\theta2$ degrees, where positive $\sigma$ defines an angle of elevation (above the horizontal) and negative $\sigma$ defines an angle of depression (below the horizontal) and $\theta1$ and $\theta2$ are each in the range 0 to 90 degrees. The transmission at different vertical directional angles $\sigma$ may occur, in an alternative A1, in parallel (e.g. with the directed beam being transmitted at all vertical directional angles $\sigma$ in the range of $-\theta1$ to $+\theta2$ at the same time) or may occur, in an alternative A2, at different times (e.g. with transmission occurring for a having different values, or being in different sub-ranges of the range $-\theta1$ to $+\theta2$, at different times). In the former case (alternative A1), the directed beam may be received by mobile devices above and/or below the horizontal plane for the transmitter of the directed beam as well as at the same horizontal plane (e.g. may be received on floors above and/or below that of the transmitter as well as on the same floor in a multi-story building) which may enable the techniques so far described herein to be applied to determining the horizontal location (but not necessarily the vertical location) of mobile devices at different vertical levels (e.g. on different floors of a building) which may be useful to extend the horizontal location capability of these techniques. In the latter case (alternative A2), the directed beam may encode an indication of a vertical directional angle $\sigma$ or a current sub-range for $\sigma$, such as a sub-range from $\theta3$ to $\theta4$ where $-\theta1 \leq \theta3 < \theta4 \leq +\theta2$, in addition to or instead of encoding an indication of a horizontal directional angle. Additionally, when transmission of a directed beam with a vertical directional angle $\sigma$ is restricted to one value of $\sigma$ at a time, or one sub-range for $\sigma$ at a time from some overall range (such as $-\theta1$ to $+\theta2$), a transmitter may transmit a directed beam through (i) a sequence of horizontal directional angles for a fixed vertical directional angle followed by the same sequence of horizontal directional angles for other fixed vertical directional angles; (ii) a sequence of vertical directional angles for a fixed horizontal directional angle followed by the same sequence of vertical directional angles for other fixed horizontal directional angles; or (iii) through a sequence of different horizontal and vertical directional angles where vertical and horizontal changes in the directional angles are intersperced. Directed beams may be transmitted with different vertical directional angles (and different horizontal directional angles) using multiple antennas, multiple antenna arrays and/or phase array antennas.

Directed beams that have a vertical directional angle may enable mobile devices that are above or below a horizontal plane for a transmitter (e.g. on different floors of a building)

to receive a directed signal from the transmitter and determine a horizontal directional angle, a vertical directional angle or both a horizontal and a vertical directional angle to or from the transmitter. This may enable location of mobile devices both horizontally and vertically in multi-story buildings or other structures with varying vertical levels (e.g. a concert hall or sports stadium) with greater accuracy and reliability since a mobile device may be able to receive a directed beam from a transmitter at a different vertical level to the mobile device (e.g. a transmitter on a different floor of a multi-story building) and determine a most probable horizontal directional angle and/or a most probable vertical directional angle from the transmitter to the mobile device. It will be appreciated by those familiar with the art that many of the techniques and examples described previously herein in association with location support for a mobile device using a horizontal directed beam will also apply to use of a beam that is directed both horizontally and vertically. As a first example of this, the directed beam may continue to use an HDP, PRS or other reference signal that has improved propagation and hearability characteristics compared to other signals. As a second example, a location of a mobile device may continue to be determined using triangulation but in 3 dimensions rather than in 2 dimensions. As a third example, techniques may continue to be used for determining a most probable directional angle at a mobile device by finding (i) a maximum received signal strength, (ii) a maximum received signal quality or (iii) a maximum correlation of measured to expected signal strength or signal quality for assumed horizontal and vertical directional angles (with correlation now considering both horizontal and vertical directional angles). And as a fourth example, determination of a directional angle by knowledge of a sequence of directional angles, a current transmission time and a starting time for a sequence of directional angles may continue to be used but with the sequence of directional angles now including both horizontal and vertical directional angles.

In further embodiments to the method described herein, a reference signal (e.g. an HDP, PRS or other reference signal having the improved propagation and hearability characteristics described earlier (e.g. in association with FIG. 5)) may be used to obtain the location of a mobile device in other ways. For example, a mobile device may use the PRS or HDP signal to measure an RTT to and from a transmitter and/or measure timing differences in reference signals received from pairs of transmitters to support positioning using the OTDOA position method. Alternatively or in addition, expected signal strength values may be measured (e.g. by mobile devices) at known locations and/or may be calculated for known locations using indoor building maps, floor plans and known transmitter propagation characteristics to create a radio heat map that may be subsequently use to position a mobile device using pattern matching by comparing measured signal strength values at the mobile device with the expected signal strength values previously measured or calculated. With these other techniques of positioning (e.g. use of RTT, OTDOA or pattern matching), a reference signal transmitted from a transmitter (e.g. WiFi AP, Bluetooth AP or femtocell) may not necessarily be focused into a beam or rotated through a sequence of directional angles. However, the improved signal propagation and hearability characteristics of the reference signal (e.g. as compared to other signals transmitted from a WiFi AP, Bluetooth AP or femtocell) may improve the reliability and accuracy of positioning. In some embodiments, the additional techniques (e.g. RTT, OTDOA, pattern matching) may be used in combination with a directed beam that rotates through a sequence of directional angles. In these embodiments, a mobile device may perform a measurement of a timing difference for OTDOA or signal strength for pattern matching when a received signal has highest strength and/or highest quality—e.g. when the directional angle for the directed beam is aligned in the direction of the mobile device relative to the transmitter. There may be benefits to supporting positioning using a combination of techniques in this case—e.g. to supporting positioning of a mobile device using measured directional angles, OTDOA time difference measurements, RTT measurements and/or pattern matching. The benefits may comprise use of the additional measurements to improve location accuracy and reliability, for example. Some further details related to combining techniques in this manner are provided further on herein.

In some instances, a transmitted wireless signal may comprise, for example, a reference signal encoded with a sequence of symbols or bits that may be used, at least in part, to provide an indication of a directional angle and/or an identity for a transmitter, to name just two examples. An indication of a directional angle may comprise, for example, a parameter indicative of a starting time of a sequence of directional angles, a current directional angle relative to a suitable frame of reference, or the like. To reduce an amount of information encoded in a reference signal and since certain information (e.g., identities, locations, orientations, etc. for wireless transmitters, etc.) may be known at a mobile device (e.g. from assistance data received from a server), the reference signal may, for example, be minimally or otherwise suitably encoded with a local ID of a wireless transmitter and a beam angle for a rotating reference signal. At times, a directional beam angle may also be encoded, at least in part, by a sequence number which may refer to a particular directional angle in a sequence of directional angles.

At times, it may be useful to distinguish a local ID of a wireless transmitter encoded in a reference signal from local IDs encoded in reference signals transmitted by other wireless transmitters that may be received at the same location. These local IDs may comprise, for example, 5-10 bits, which may depend on a number or density of wireless transmitters deployed in a particular indoor or like area of interest.

As was indicated, in some instances, an identifier of a suitable wireless transmitter may, for example, be also encoded in a transmitted wireless signal. For example, depending on an implementation, an identifier of a wireless transmitter may comprise a MAC address, a local ID, a network access ID, a cell ID, etc., or any combination thereof. An identifier of a wireless transmitter may comprise, for example, eight bits, which may depend on a number or density of wireless transmitters deployed in an indoor or like area of interest, wireless transmitter, directed beam, other encoded parameters, or the like. As discussed below, an identifier of a wireless transmitter may be used, at least in part, to estimate a location of a mobile device via OTDOA positioning, for example.

Accordingly, based, at least in part, on one or more parameters encoded in a transmitted reference signal, a location of a mobile device may, for example, be estimated using one or more appropriate positioning techniques. Thus, in an implementation, OTDOA positioning may, for example, be used to obtain a position fix. The signals measured for OTDOA (e.g. used to obtain time difference measurements between pairs of wireless transmitters) may correspond to a reference signal (e.g. an HDP or PRS reference signal) described previously in association with FIGS. 1-6. Moreover, the reference signal may or may not include beam forming and rotation of a directed beam. When OTDOA is being supported, an applicable wireless transmitter may measure real time differences (RTDs) between reference signal transmitted by this transmitter and one or more reference signals transmitted by other transmitters Here, RTDs may, for example, be determined from known locations of the wireless transmitters and Observed Time Difference (OTD) measurements from each wireless transmitter. RTDs may also be determined from knowledge of some global time at each transmitter (e.g. GPS time) and in some cases may be zero or almost zero if some or all wireless transmitters synchronize their transmission time to a common global time. In particular implementations, RTDs may be obtained after transmission of a reference signal has occurred, for example. RTDs may be provided to a mobile device as positioning assistance data by a suitable server (e.g., a location server, etc.), for example, or possibly by one or more applicable wireless transmitters soon after transmission of reference signals had occurred. Positioning parameters or techniques, such as Real Time Differences (RTDs), Observed Time Differences (OTDs), Round-Trip propagation Times (RTTs), Time of Arrival (TOA), Observed Time Difference of Arrival (OTDOA), etc. are generally known and need not be described here in greater detail.

In some instances, however, certain parameter encoding, such as in a rotated reference signal may result in degraded positioning performance, such as if OTDOA is used, for example. Thus, at times, such as to facilitate or support OTDOA positioning, for example, some or all of applicable parameters (e.g., information for RTDs, location, orientation, etc. of wireless transmitters, etc.) may be provided after transmission of an associated reference signal since they may generally be derived from measurements by other wireless transmitters of a particular reference signal occurrence. For example, if a first wireless transmitter transmits a reference signal occurrence at time T1, and a second wireless transmitter transmits a reference signal occurrence at time T2 soon after T1, a precise RTD may be seen by the first wireless transmitter or the second wireless transmitter at time T2. This RTD may then be provided to a suitable server (e.g., a location server, etc.) that may then provide the RTD to a mobile device that may have measured OTDs between the transmissions from the first and second wireless transmitters. Here, a provision of an RTD to a mobile device may occur sometime after T2, for example, at which time the mobile device may make use of an OTD measurement and provided RTD to estimate its location.

Optionally or alternatively, a mobile device may provide an OTD measurement to a suitable server (e.g., a location server, etc.) that may, for example, combine this measurement with an RTD received from a first or second wireless transmitter to compute an estimated location of a mobile device. A wireless transmitter may provide information about each of its reference signal transmission occurrences (e.g. RTD information, beam angle, signal strength, etc.) to a location server for use by the server, for example, or may communicate information to one or more applicable mobile devices (e.g. via broadcast or point to point means). In some instances, some or all of this information may be determined by a suitable server (e.g., a location server, etc.) and configured in one or more wireless transmitters in advance, such as by such a server, for example. At times, a server may provide to a mobile device any information configured in advance in one or more wireless transmitters for their reference signal occurrences, such as to assist the mobile device in acquiring and measuring any reference signal occurrence (e.g., parameters on scheduling of reference signal occurrences, etc.). Of course, these are merely examples relating to OTDOA positioning via a rotated reference signal, and claimed subject matter is not so limited.

In some instances, a mobile device may, for example, estimate its location by matching or correlating one or more suitable reference signal measurements with expected signal signature values associated with a radio heat map database, as discussed above. Signal signature values may, for example, be provided to a mobile device by a suitable server (e.g., location server, etc.) as part of positioning assistance data. For example, a radio heat map database may maintain expected signal signature values specific just to reference signals, as one possible implementation. These may include, for example, one or more relative signal strength values, signal quality values, etc. for different directional angles of a directed beam, such as associated with different discrete locations within an indoor or like area of interest. Optionally or alternatively, a radio heat map database may also maintain expected signal strength signature values for a typical or normal transmission from wireless transmitters associated with different discrete locations within the area. These expected signal strength signature values may, for example, be used, at least in part, separately or in any suitable combination with expected signal signature values specific to reference signals.

Thus, in an implementation, one or more signal characteristics of a directed beam (e.g., RSSI, RTT, etc.) may, for example, be measured and compared with one or more expected signal signature values (e.g., specific to reference signals, etc.) to determine correlation, such as using one or more appropriate techniques. For example, by finding an expected signal signature value, specific to reference signals or otherwise, in a database that most closely matches or correlates with characteristics exhibited by signals currently received at a mobile device, a location associated with a matching signature may be used as an estimated location of the mobile device. In this particular implementation, a reference signal that does not rotate may, for example, have some advantages over a reference signal that is rotated in a horizontal plane, as discussed above. Claimed subject matter is not limited to such an observation or advantage, of course.

In certain implementations, to compute a position fix, instead of or in addition to measuring or correlating one or more signal characteristics (e.g., RSSI, etc.) of a directed beam, a mobile device may, for example, measure or obtain one or more parameters related to a directional angle for the beam. These one or more parameters may, for example, be used, at least in part, in one or more appropriate positioning techniques, as was indicated, to estimate a "mobile device-wireless transmitter" distance or direction. For example, a directed beam transmitted by a wireless transmitter may be acquired or received by a mobile device. One or more parameters or references related to a directional angle for the directed beam, such as, for example, a current directional angle (e.g., encoded, etc.), TOA, RTT, OTD, etc. may be measured, and a position fix of a mobile device may be obtained based, at least in part, on these one or more parameters or references.

For example, in at least one implementation, at least two wireless transmitters positioned at known locations and two measured current directional angles may be used, at least in part, to derive a location of a mobile device. A position fix of a mobile device may, for example, be obtained via an intersection of one or more pairs of directional angles (e.g., lines formed by a radius from each of these transmitters to the mobile device). Measurements of current directional angles or locations of wireless transmitters may, for example, be obtained via a directed beam, communication with a suitable server, etc., such as discussed above. As was also indicated, here, a reference signal may, for example, provide advantages compared to other signals since location estimates via angular directions for normal signals may degrade as a mobile device moves farther away from wireless transmitters. Thus, a reference signal may facilitate or support more accurate indoor positioning, for example, since higher accuracy measurements in larger, complex, cluttered, etc. environments may be limited or affected by shadowing, multipath reflections, typical WiFi signal fragmentation, blockage, or the like. In some instances, such as if more than two directional angles are used, for example, of if there is an uncertainty with respect to a position fix (e.g., angles do not intersect at one point, etc.), a calculation of a centroid or average location based, at least in part, on intersection points may be used to estimate a location of a mobile device. Claimed subject matter is not limited in these regards, of course.

At times, a location of a mobile device may, for example, be estimated from at least one directional angle and an RTT measurement between the mobile device and one or more wireless transmitters. For example, a mobile device or a wireless transmitter may measure an RTT between the mobile device and the wireless transmitter and the mobile device may also measure a most probable directional angle to or from the same wireless transmitter. If the location of the wireless transmitter is known, the location of the mobile device may be determined as a point on a straight horizontal line through the wireless transmitter that is aligned with the measured directional angle and has a distance from the wireless transmitter equal to the distance traveled by a wireless signal in a time of RTT/2. In another example, a mobile device or a first wireless transmitter may measure an RTT between the mobile device and the first wireless transmitter and the mobile device may also measure a most probable directional angle to or from a second wireless transmitter. If the location of the first and second wireless transmitters are known, the location of the mobile device may be determined as a point on a straight horizontal line through the second wireless transmitter that aligns with the directional angle to or from the second wireless transmitter and intesects with a circle around the first wireless transmitter at the center of the circle where the radius of the circle equals the distance traveled by a wireless signal in a time of RTT/2.

Likewise, in some instances, a location of a mobile device may, for example, be estimated from at least one directional angle and an OTD value measured for two or more known wireless transmitters by a mobile device. Here, the measured OTD value and any known RTD between the two transmitters combined with known locations for the two transmitters may locate the mobile device on a particular hyperbolic curve defined relative to the locations of the two transmitters. The intersection point of this hyperbolic curve and a horizontal straight line passing through the transmitter for which a directional angle was measured and aligned to this directional angle may provide a location estimate for the mobile device. In the case where two intersection points occur, additional information such as an approximate location of the mobile device obtained from a last known location, current serving cell, current serving access point or other means may be used to resolve the ambiguity (as is known in the art). Of course, these are merely examples of positioning techniques that may be used, at least in part, with a transmitted reference signal, and claimed subject matter is not limited in these regards. For example, a mobile device may be located by using other combinations of directional angles, RTT values and OTD values than the combinations exemplified here.

Figure 7:
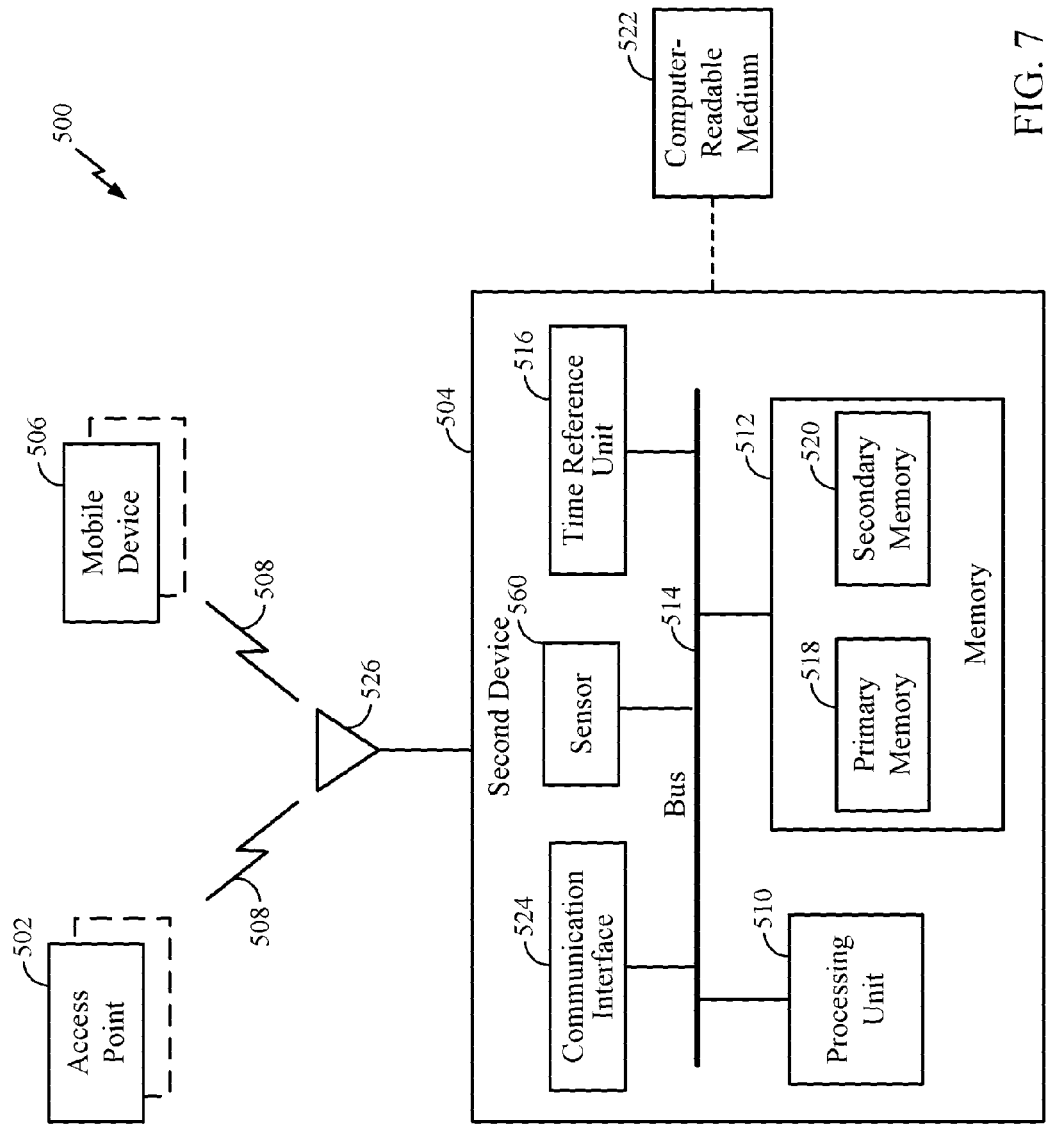
FIG. 7 is a schematic diagram illustrating an implementation of an example computing environment associated with a wireless transmitter.

FIG. 7 is a schematic diagram illustrating an implementation of an example computing environment 500 that may include one or more computing devices capable of implementing or supporting one or more operations or processes for utilizing a reference signal for indoor positioning, such as discussed above in connection with FIGS. 1-6, for example. Computing environment 500 may include, for example, a number of wireless transmitters, such as WiFi access points 502 and 504, for example, and a mobile device 506, which may be operatively coupled together via a wireless communications network, as illustrated generally via links at 508. Associated computing devices may be representative of any device, appliance, platform, or machine that may be capable of exchanging information over one or more communications networks in accordance with example implementations described herein. As an example, mobile device 506 may correspond to or be representative of mobile device 102 in FIG. 1, mobile device 202 in FIG. 2, mobile device 308 in FIG. 3 or mobile device 42 in FIG. 4. WiFi access points 502 and 504 may correspond to or be representative of local transceiver 112 in FIG. 1, any of wireless transmitters 204, 206 and 208 in FIG. 2, transmitter 304 in FIG. 3 and any of transmitters 44 and 46 in FIG. 4.

In an implementation, a wireless communications network may correspond to or be representative of network 122 in FIG. 1 or network 212 in FIG. 2 and may be representative of one or more communication links, processes, or resources capable of supporting an exchange of information between at least two of access point 502, access point 504, or mobile device 506. By way of example but not limitation, a wireless communications network may include one or more wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via dashed lined boxes partially obscured by access point 502 or mobile device 506, there may be additional or like devices operatively coupled to a wireless communications network. It is also recognized that all or part of various devices or networks shown in computing environment 500, or processes or methods, as described herein, may be implemented using or otherwise including hardware, firmware, software, or any combination thereof.

By way of example but not limitation, access point 504 may include at least one processing unit 510 that may be operatively coupled to a memory 512 via a bus 514. Processing unit 510 may be representative of one or more circuits capable of performing at least a portion of a suitable computing procedure or process. For example, processing unit 510 may include one or more processors, controllers, microprocessors, microcontrollers, application specific integrated circuits, digital signal processors, programmable logic devices, field programmable gate arrays, or the like, or any combination thereof. As also illustrated, access point 504 may include, for example, a time reference unit 516 that may facilitate or support labeling of one or more timestamps, such as to discern a distance a signal has traveled, for example, clock synchronization between measuring units, distributing time from a central source, or the like. In some implementations, time reference unit 516 may be at least partially integrated with a suitable processing unit, such as processing unit 510, for example, though claimed subject matter is not so limited.

In certain implementations, processing unit 510 may comprise, for example, or be representative of means for forming a first directed beam via a transmission of a wireless signal at a sequence of directional angles in a horizontal plane; and means for encoding an indication of a directional angle of the sequence of directional angles of the first directed beam in the wireless signal, as illustrated in or described with respect to operations 402-404 of FIG. 5. In some instances, processing unit 510 may comprise, for example, or be representative of means for encoding an identifier of the first transmitter in the wireless signal, such as illustrated in or described herein.

Memory 512 may be representative of any information storage mechanism or appliance. Memory 512 may include, for example, a primary memory 518 and a secondary memory 520. Primary memory 518 may include, for example, a random access memory, read only memory, etc. While illustrated in this example as being separate from processing unit 510, it should be understood that all or part of primary memory 518 may be provided within or otherwise co-located/coupled with processing unit 510. Secondary memory 520 may include, for example, the same or similar type of memory as primary memory or one or more information storage devices or systems, such as, for example, a disk drive, an optical disc drive, a tape drive, a solid state memory drive, etc. In certain implementations, secondary memory 520 may be operatively receptive of, or otherwise configurable to couple to, a computer-readable medium 522. Computer-readable medium 522 may include, for example, any non-transitory storage medium that may carry or make accessible information, code, or instructions for one or more of devices in computing environment 500. Computer-readable medium 522 may also be referred to as a storage medium.

Access point 504 may include, for example, a communication interface 524 that may provide for or otherwise support an operative coupling of access point 504 to a wireless communications network at least through an antenna 526. Communication interface 524 may be enabled to form and rotate a directed beam through a sequence of directional angles in combination with antenna 526 which may consist of multiple antennas, an antenna array or a phased antenna array. By way of example but not limitation, communication interface 524 may include a network interface device or card, a modem, a router, a switch, a transceiver, and the like. Although not shown, access point 504 may also include, for example, an input/output device. An input/output device may be representative of one or more devices or features that may be configurable to accept or otherwise introduce human or machine inputs, or one or more devices or features that may be capable of delivering or otherwise providing for human or machine outputs. By way of example but not limitation, an input/output device may include an operatively configured display, speaker, keyboard, mouse, trackball, touch screen, data port, or the like.

In an implementation, access point 504 may include a sensor 560 that may comprise a compass, magnetometer, gyroscope and/or other inertial sensor that may enable access point 504 (e.g. processing unit 510) to determine an orientation of access point 504—e.g. an orientation relative an absolute geographic direction such a true North or South or a magnetic direction such as magnetic North.

Figure 8:
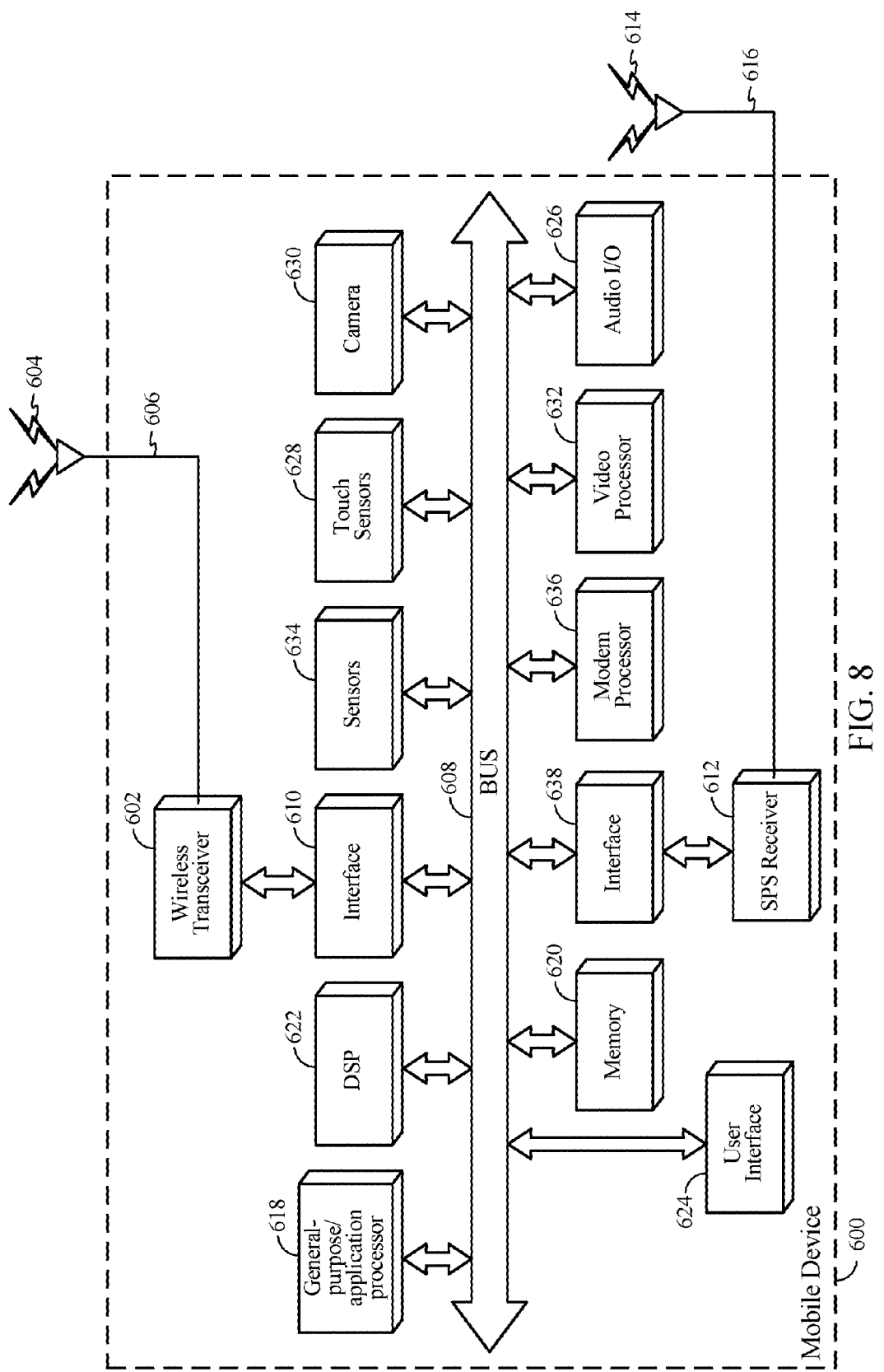
FIG. 8 is a schematic diagram illustrating an implementation of an example computing environment associated with a mobile device.

FIG. 8 is a schematic diagram of an implementation of an example computing environment associated with a mobile device that may be used, at least in part, to facilitate or support one or more operations or techniques for utilizing a reference signal for indoor positioning, such as in a larger, cluttered, complex, etc. indoor or like environment. An example computing environment may comprise, for example, a mobile device 600 that may include one or more features or aspects of mobile device 102 of FIG. 1, mobile device 202 of FIG. 2, mobile device 308 of FIG. 3 and/or mobile device 42 of FIG. 4 though claimed subject matter is not so limited. For example, in some instances, mobile device 600 may comprise a wireless transceiver 602 capable of transmitting or receiving wireless signals, referenced generally at 604, such as via an antenna 606 over a suitable wireless communications network. Wireless transceiver 602 may, for example, be capable of sending or receiving one or more suitable communications, such as one or more communications discussed with reference to FIGS. 1-4 and FIG. 6, as one possible example.

Wireless transceiver 602 may, for example, be coupled or connected to a bus 608 via a wireless transceiver bus interface 610. Depending on an implementation, at times, wireless transceiver bus interface 610 may, for example, be at least partially integrated with wireless transceiver 602. Some implementations may include multiple wireless transceivers 602 or antennas 606 so as to enable transmitting or receiving signals according to a corresponding multiple wireless communication standards such as Wireless Fidelity (WiFi), Code Division Multiple Access (CDMA), Wideband-CDMA (W-CDMA), Long Term Evolution (LTE), Bluetooth®, just to name a few examples.

In an implementation, mobile device 600 may, for example, comprise an SPS or like receiver 612 capable of receiving or acquiring one or more SPS or other suitable wireless signals 614, such as via an SPS or like antenna 616. SPS receiver 612 may process, in whole or in part, one or more acquired SPS signals 614 for estimating a location, coarse or otherwise, of mobile device 600. In some instances, one or more general-purpose application processors 618, memory 620, digital signal processor(s) (DSP) 622, or like specialized devices or processors not shown may be utilized to process acquired SPS signals 614, in whole or in part, calculate a location of mobile device 600, such as in conjunction with SPS receiver 612, or the like. Storage of SPS or other signals for implementing one or more positioning operations, such as in connection with one or more techniques for utilizing a reference signal for indoor positioning, for example, may be performed, at least in part, in memory 620, suitable registers or buffers (not shown). Although not shown, it should be appreciated that in at least one implementation one or more processors 618, memory 620, DSPs 622, or like specialized devices or processors may comprise one or more processing modules capable of receiving a first directed beam transmitted by a first transmitter, wherein the first directed beam is transmitted in a first sequence of directional angles in a horizontal plane; determining a most probable directional angle for the first directed beam; measuring a first parameter related to the most probable directional angle for the first directed beam; and determining a location of the mobile device based, at least in part, on the measured first parameter. In some instances, one or more processors 618, memory 620, DSPs 622, or like specialized devices or processors may comprise one or more processing modules capable of receiving a second directed beam transmitted by a second transmitter, wherein the second directed beam is transmitted in a second sequence of directional angles in a horizontal plane; determining a most probable directional angle for the second directed beam; measuring a second parameter related to the most probable directional angle for the second directed beam; and determining the location of the mobile device based, at least in part, on the measured first parameter and the measured second parameter. It should also be noted that all or part of one or more processing modules may be implemented using or otherwise including hardware, firmware, software, or any combination thereof.

As illustrated, DSP 622 may be coupled or connected to processor 618 and memory 620 via bus 608. Although not shown, in some instances, bus 608 may comprise one or more bus interfaces that may be integrated with one or more applicable components of mobile device 600, such as DSP 622, processor 618, memory 620, or the like. In various embodiments, one or more operations or functions described herein may be performed in response to execution of one or more machine-readable instructions stored in memory 620, such as on a computer-readable storage medium, such as RAM, ROM, FLASH, disc drive, etc., just to name a few examples. Instructions may, for example, be executable via processor 618, one or more specialized processors not shown, DSP 622, or the like. Memory 620 may comprise a non-transitory processor-readable memory, computer-readable memory, etc. that may store software code (e.g., programming code, instructions, etc.) that may be executable by processor 618, DSP 622, or the like to perform operations or functions described herein.

Mobile device 600 may comprise a user interface 624, which may include any one of several devices such as, for example, a speaker, microphone, display device, vibration device, keyboard, touch screen, etc., just to name a few examples. In at least one implementation, user interface 624 may enable a user to interact with one or more applications hosted on mobile device 600. For example, one or more devices of user interface 624 may store analog or digital signals on memory 620 to be further processed by DSP 622, processor 618, etc. in response to input or action from a user. Similarly, one or more applications hosted on mobile device 600 may store analog or digital signals in memory 620 to present an output signal to a user. In some implementations, mobile device 600 may optionally include a dedicated audio input/output (I/O) device 626 comprising, for example, a dedicated speaker, microphone, digital to analog circuitry, analog to digital circuitry, amplifiers, gain control, or the like. It should be understood, however, that this is merely an example of how audio I/O device 626 may be implemented, and that claimed subject matter is not limited in this respect. As seen, mobile device 600 may comprise one or more touch sensors 628 responsive to touching or like pressure applied on a keyboard, touch screen, or the like.

In an implementation, mobile device 600 may comprise, for example, a camera 630, dedicated or otherwise, such as for capturing still or moving imagery, or the like. Camera 630 may comprise, for example, a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may, for example, be performed, at least in part, at processor 618, DSP 622, or the like. Optionally or alternatively, a video processor 632, dedicated or otherwise, may perform video conditioning, encoding, compression, or manipulation of signals representing one or more captured images. Additionally, video processor 632 may, for example, decode or decompress one or more stored images for presentation on a display (not shown) of mobile device 600.

Mobile device 600 may comprise one or more sensors 634 coupled or connected to bus 608, such as, for example, one or more inertial sensors, ambient environment sensors, or the like. Inertial sensors of sensors 634 may comprise, for example, one or more accelerometers (e.g., collectively responding to acceleration of mobile device 600 in one, two, or three dimensions, etc.), gyroscopes or magnetometers (e.g., to support one or more compass or like applications, etc.), etc., just to illustrate a few examples. Ambient environment sensors of mobile device 600 may comprise, for example, one or more barometric pressure sensors, temperature sensors, ambient light detectors, camera sensors, microphones, etc., just to name few examples. Sensors 634 may generate analog or digital signals that may be stored in memory 620 and may be processed by DSP 622, processor 618, etc., such as in support of one or more applications directed to positioning or navigation operations, wireless communications, gaming or the like.

In a particular implementation, mobile device 600 may comprise a modem processor 636, dedicated or otherwise, capable of performing baseband processing of signals received or downconverted via wireless transceiver 602, SPS receiver 612, or the like. Similarly, modem processor 636 may perform baseband processing of signals to be upconverted for transmission via wireless transceiver 602, for example. In alternative implementations, instead of having a dedicated modem processor, baseband processing may be performed, at least in part, by processor 618, DSP 622, or the like. In addition, in some instances, an interface 638, although illustrated as a separate component, may be integrated, in whole or in part, with one or more applicable components of mobile device 600, such as bus 608 or SPS receiver 612, for example. Optionally or alternatively, SPS receiver 612 may be coupled or connected to bus 608 directly. It should be understood, however, that these are merely examples of components or structures that may perform baseband processing, and that claimed subject matter is not limited in this regard.

Figure 9:
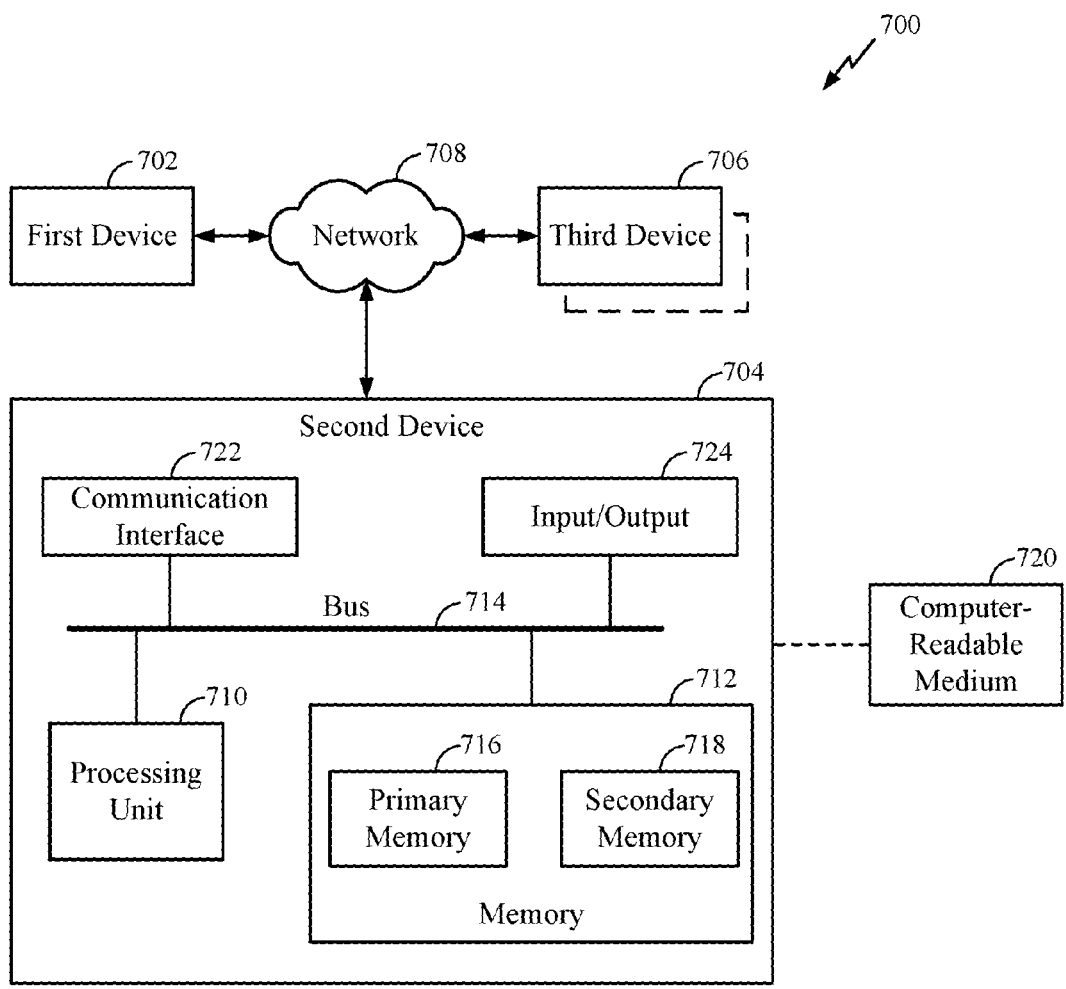
FIG. 9 is a schematic diagram illustrating an implementation of an example computing environment associated with a server.

FIG. 9 is a schematic diagram illustrating an implementation of an example computing environment 700 that may include one or more servers or other devices capable of partially or substantially implementing or supporting one or more operations or processes for utilizing a reference signal for indoor positioning, as discussed above in connection with FIGS. 1-6, for example. Computing environment 700 may include, for example, a first device 702, a second device 704, a third device 706, etc., which may be operatively coupled together via a communications network 708.

First device 702, second device 704, or third device 706 may be representative of any device, appliance, platform, or machine that may be capable of exchanging information over communications network 708. For example, any of first device 702, second device 704, or third device 706 may correspond to or be representative of any of servers 116, 118 and 120 in FIG. 1, any of servers 214, 216 or 218 in FIG. 2 or server 48 in FIG. 4. By way of example but not limitation, any of first device 702, second device 704, or third device 706 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 702, 704, and 706, respectively, may further comprise one or more of a mobile device, wireless transmitter, server, etc. in accordance with example implementations described herein.

In an implementation, communications network 708 may be representative of one or more communication links, processes, or resources capable of supporting an exchange of information between at least two of first device 702, second device 704, or third device 706. Communications network may correspond to or be representative of network 122 in FIG. 1 or network 212 in FIG. 2. By way of example but not limitation, communications network 708 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 706, there may be additional like devices operatively coupled to communications network 708. It is also recognized that all or part of various devices or networks shown in computing environment 700, or processes or methods, as described herein, may be implemented using or otherwise including hardware, firmware, software, or any combination thereof.

By way of example but not limitation, second device 704 may include at least one processing unit 710 that may be operatively coupled to a memory 712 via a bus 714. Processing unit 710 may be representative of one or more circuits capable of performing at least a portion of a suitable computing procedure or process. For example, processing unit 710 may include one or more processors, controllers, microprocessors, microcontrollers, application specific integrated circuits, digital signal processors, programmable logic devices, field programmable gate arrays, or the like, or any combination thereof. Although not shown, second device 704 may include a location-tracking unit that may initiate a coarse position fix of a mobile device of interest, such as in an indoor or like area of interest, for example, based, at least in part, on one or more recently received or acquired wireless signals, such as from an SPS. In some implementations, a location-tracking unit may be at least partially integrated with a suitable processing unit, such as processing unit 710, for example, though claimed subject matter is not so limited.

Memory 712 may be representative of any information storage mechanism or appliance. Memory 712 may include, for example, a primary memory 716 and a secondary memory 718. Primary memory 716 may include, for example, a random access memory, read only memory, etc. While illustrated in this example as being separate from processing unit 710, it should be understood that all or part of primary memory 716 may be provided within or otherwise co-located/coupled with processing unit 710. Secondary memory 718 may include, for example, same or similar type of memory as primary memory or one or more information storage devices or systems, such as, for example, a disk drive, an optical disc drive, a tape drive, a solid state memory drive, etc. In certain implementations, secondary memory 718 may be operatively receptive of, or otherwise capable of being coupled to, a computer-readable medium 720. Computer-readable medium 720 may include, for example, any non-transitory storage medium that may carry or make accessible information, code, or instructions for one or more of devices in computing environment 700. Computer-readable medium 720 may also be referred to as a storage medium.

Second device 704 may include, for example, a communication interface 722 that may provide for or otherwise support an operative coupling of second device 704 to at least communications network 708. By way of example but not limitation, communication interface 722 may include a network interface device or card, a modem, a router, a switch, a transceiver, and the like. Second device 704 may also include, for example, an input/output device 724. Input/output device 724 may be representative of one or more devices or features that may be configurable to accept or otherwise introduce human or machine inputs, or one or more devices or features that may be capable of delivering or otherwise providing for human or machine outputs. By way of example but not limitation, input/output device 724 may include an operatively configured display, speaker, keyboard, mouse, trackball, touch screen, information port, or the like.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform functions described herein. Any machine readable medium tangibly embodying instructions may be used in implementing methodologies described herein. For example, software codes may be stored in a memory and executed by a processor. Memory may be implemented within the processor or external to the processor. As used herein the term "memory" refers to any type of long term, short term, volatile, non-volatile, or other memory and is not to be limited to any particular type of memory or number of memories, or type of media upon which memory is stored. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information as binary information (e.g., via ones and zeros). As such, in a particular implementation, such a change of state of the portion of the storage media to store a signal representative of information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to store desired program code in the form of instructions or information structures and that may be accessed by a computer or processor thereof. Disk and disc, as used herein, includes compact disc (CD), laser disc, optical disc, digital versatile disc (DVD), floppy disk and blue-ray disc where disks usually reproduce information magnetically, while discs reproduce information optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In an implementation, a mobile device may, for example, be capable of communicating with one or more femtocells, such as for the purpose of estimating its location, communicating with a suitable server, or the like. As used herein, "femtocell" may refer to one or more smaller-size cellular base stations that may be capable of detecting a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, if applicable, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method for locating a mobile device comprising:
receiving, at said mobile device, a directed beam transmitted by a wireless transmitter via a wireless signal in a sequence of directional angles in a horizontal plane, said wireless signal having been encoded with an indication of a directional angle of said sequence of directional angles of said directed beam;
decoding said wireless signal to obtain said indication of said directional angle;
obtaining at least one time of arrival (TOA) measurement related to said directional angle of said sequence of directional angles of said directed beam; and
determining a location of said mobile device based, at least in part, on said at least one TOA measurement and said indication of said directional angle.

2. The method of claim 1, wherein said sequence of said directional angles comprises: a plurality of angles that change by discrete values; or a plurality of angles that change continuously between 0 and 360 degrees; or a combination thereof.

3. The method of claim 1, wherein said sequence of directional angles is represented via: positive changes; or negative changes; or a combination thereof.

4. The method of claim 1, wherein said sequence of directional angles rotates said directed beam around a circle in a clockwise direction; or counterclockwise direction; or a combination thereof.

5. The method of claim 1, wherein said directional angle is relative to an absolute geographic direction or a magnetic direction.

6. The method of claim 1, wherein said directional angle is relative to an orientation of said wireless transmitter.

7. The method of claim 1, wherein said wireless signal comprises at least one of: a highly detectable pilot (HDP) signal or a positioning reference signal (PRS).

8. The method of claim 7, wherein said HDP or said PRS signal comprises a reference signal having: a higher transmission power than that for other signals transmitted by said wireless transmitter; a different channel than that for other signals transmitted by said wireless transmitter; a signal modulation or encoding with better propagation or lesser attenuation or lower attenuation factor than that for other signals transmitted by said wireless transmitter; a known sequence of bits or symbols that may be received and coherently integrated over time by said mobile device; a muting by one or more other transmitters during said transmission by said wireless transmitter; a bit or symbol encoding sequence that is orthogonal to an encoding sequence used, at least in part, for one or more other reference signals transmitted by said wireless transmitter or reference signals transmitted by one or more other wireless transmitters; or a combination thereof.

9. The method of claim 1, wherein said wireless signal is encoded with an identifier of said first wireless transmitter.

10. The method of claim 9, wherein said identifier comprises at least one of the following: a media access control (MAC) address; a local ID; a network access ID; a cell ID; or any combination thereof.

11. The method of claim 1, and further comprising:
receiving from a server a communication comprising at least one of: a location of said wireless transmitter; a start time for a sequence of directional angles for said wireless transmitter; or a combination thereof; and
determining said location of said mobile device based, at least in part, on said received communication.

12. The method of claim 1, and further comprising:
obtaining a timing reference comprising at least one of: a round trip propagation time (RTT) to said wireless transmitter; an RTT to one or more other wireless transmitters; an observed time difference (OTD) between said wireless transmitter and one or more other wireless transmitters; and
determining said location of said mobile device based, at least in part, on said timing reference.

13. The method of claim 1, wherein said sequence of directional angles targets a most likely location of said mobile device.

14. The method of claim 1, wherein said sequence of directional angles targets an estimated location of said mobile device.

15. The method of claim 1, and further comprising:
receiving one or more other wireless signals comprising one or more other directed beams transmitted by one or more other wireless transmitters, said one or more other directed beams being transmitted in respective sequences of directional angles in a horizontal plane;
obtaining a most probable directional angle for said one or more other directed beams;
decoding said one or more other wireless signals to obtain at least one other TOA measurement related to said most probable directional angle for said one or more other directed beams; and
determining said location of said mobile device based, at least in part, on said at least one other TOA measurement.

16. An apparatus comprising:
a mobile device comprising:
a wireless transceiver to communicate with an electronic communications network; and
one or more processors to:
receive, at said mobile device, a directed beam transmitted by a wireless transmitter via a wireless signal in a sequence of directional angles in a horizontal plane, said wireless signal having been encoded with an indication of a directional angle of said sequence of directional angles of said directed beam;
decode said wireless signal to obtain said indication of said directional angle;
obtain at least one time of arrival (TOA) measurement related to said directional angle of said sequence of directional angles of said directed beam; and determine a location of said mobile device based, at least in part, on said at least one TOA measurement and said indication of said directional angle.

17. The apparatus of claim 16, wherein said wireless signal comprises at least one of: a highly detectable pilot (HDP) signal or a positioning reference signal (PRS).

18. The apparatus of claim 16, wherein said one or more processors further to:

receive one or more other wireless signals comprising one or more other directed beams transmitted by one or more other wireless transmitters, said one or more other directed beams being transmitted in respective sequences of directional angles in a horizontal plane;

determine a most probable directional angle for said one or more other directed beams;

obtain at least one other TOA measurement related to said most probable directional angle for said one or more other directed beams; and determine said location of said mobile device based, at least in part, on said at least one other TOA measurement.

19. A non-transitory storage medium having instructions executable by a processor to:

receive, at a mobile device, a directed beam transmitted by a wireless transmitter via a wireless signal in a sequence of directional angles in a horizontal plane, said wireless signal having been encoded with an indication of a directional angle of said sequence of directional angles of said directed beam;

decode said wireless signal to obtain said indication of said directional angle;

obtain at least one time of arrival (TOA) measurement related to said directional angle of said sequence of directional angles of said directed beam; and determine a location of said mobile device based, at least in part, on said at least one TOA measurement and said indication of said directional angle.

* * * * *